(12) United States Patent
Aso et al.

(10) Patent No.: US 11,710,295 B2
(45) Date of Patent: Jul. 25, 2023

(54) STORAGE MEDIUM, SHAPE DATA OUTPUT METHOD, AND INFORMATION PROCESSING DEVICE

(71) Applicant: FUJITSU LIMITED, Kawasaki (JP)

(72) Inventors: Noriyasu Aso, Isehara (JP); Masatoshi Ogawa, Zama (JP)

(73) Assignee: FUJITSU LIMITED, Kawaski (JP)

( * ) Notice: Subject to any disclaimer, the term of this patent is extended or adjusted under 35 U.S.C. 154(b) by 59 days.

(21) Appl. No.: 17/405,137

(22) Filed: Aug. 18, 2021

(65) Prior Publication Data

US 2022/0148277 A1 May 12, 2022

(30) Foreign Application Priority Data

Nov. 6, 2020 (JP) ................................ 2020-185727

(51) Int. Cl.
*G06V 10/44* (2022.01)
*G06T 19/20* (2011.01)
(Continued)

(52) U.S. Cl.
CPC .............. *G06V 10/44* (2022.01); *G06F 18/10* (2023.01); *G06T 19/20* (2013.01);
(Continued)

(58) Field of Classification Search
CPC . G06T 19/20; G06T 2219/2021; G06T 19/00; G06V 10/44; G06V 10/761; G06V 10/764; G06F 18/10
See application file for complete search history.

(56) References Cited

U.S. PATENT DOCUMENTS 5,265,197 A   11/1993  Kondo
6,882,746 B1* 4/2005  Naveen .................. G06V 10/32
                                            382/293
(Continued)

FOREIGN PATENT DOCUMENTS

JP    H03-206564 A    9/1991
JP    H09-179892 A    7/1997
(Continued)

OTHER PUBLICATIONS

Ihara et al, "Attribute Factor Analysis Method, Device, and Program", PCT, "WO2015145785", (Year: 2015).*
(Continued)

*Primary Examiner* — YuJang Tswei
(74) *Attorney, Agent, or Firm* — Fujitsu Patent Center

(57) ABSTRACT

A non-transitory computer-readable storage medium storing a shape data output program that causes at least one computer to execute process, the process includes, normalizing each shape data of a plurality of pieces of shape data for each component in each coordinate axis direction to create unit shape data; classifying the plurality of pieces of shape data based on the created unit shape data of each of the pieces of shape data; specifying, based on dimensions of sites of each shape data in classified group, a dimensional relationship between different sites of the shape data in the group; and outputting information indicating the specified dimensional relationship in association with the unit shape data of the shape data in the group.

17 Claims, 19 Drawing Sheets

(51) Int. Cl.
  *G06F 18/10* (2023.01)
  *G06V 10/74* (2022.01)
  *G06V 10/764* (2022.01)

(52) U.S. Cl.
  CPC .... *G06T 2219/2021* (2013.01); *G06V 10/761* (2022.01); *G06V 10/764* (2022.01)

(56) References Cited

U.S. PATENT DOCUMENTS

| | | | | |
|---|---|---|---|---|
| 8,429,174 | B2* | 4/2013 | Ramani | G06V 30/1988 345/473 |
| 2004/0032408 | A1 | 2/2004 | Doi et al. | |
| 2014/0161346 | A1* | 6/2014 | Ishiyama | G06V 40/175 382/154 |
| 2017/0143494 | A1* | 5/2017 | Mahfouz | A61F 2/4657 |
| 2018/0204111 | A1* | 7/2018 | Zadeh | G06N 3/0436 |
| 2018/0284727 | A1* | 10/2018 | Cramer | B33Y 50/02 |
| 2019/0340198 | A1 | 11/2019 | Hamada et al. | |
| 2020/0184278 | A1* | 6/2020 | Zadeh | G06K 9/6264 |
| 2020/0320685 | A1* | 10/2020 | Anssari Moin | G06V 10/454 |
| 2021/0027532 | A1* | 1/2021 | Lin | G06V 20/176 |

FOREIGN PATENT DOCUMENTS

| | | |
|---|---|---|
| JP | 2004-021773 A | 1/2004 |
| JP | 2006-139486 A | 6/2006 |
| WO | 2017/217032 A1 | 12/2017 |

OTHER PUBLICATIONS

Dang et al, "SAFE: Structure-aware Facade Editing", 2014, Eurographics, (Year: 2014).*

Nishida et al, "Interactive Sketching of Urban Procedural Models", 2016, ACM (Year: 2016).*

* cited by examiner

FIG. 5

| ID | STANDARD SHAPE DATA | RELATIONAL EXPRESSION | SIMILAR SHAPE LIST |
|---|---|---|---|
| 1 | D1" | {Re11, Re12, ...} | {1, 7, 18, 21, 33} |
| 2 | D2" | {Re21, Re22, ...} | {2, 6, 38, 51} |
| ... | ... | ... | ... |

STANDARD SHAPE DB ~230

| GROUP Ga | $I_{l1}$ | $I_{l2}$ | $I_{l3}$ | $I_{l4}$ | $I_{l5}$ | $I_{l6}$ | ... | $I_{lN}$ |
|---|---|---|---|---|---|---|---|---|
| $DG_1$ | 5 | 4 | 3 | 2 | 2 | 6 | | |
| $DG_2$ | 10 | 6 | 6 | 3 | 4 | 9 | | |
| $DG_3$ | 3 | 5 | 1.8 | 2.5 | 1.2 | 7.5 | | |
| $DG_4$ | 5 | 4 | 3 | 2 | 2 | 6 | | |
| ... | ... | | | ... | | | | |
| $DG_M$ | 10 | 6 | 5 | 4 | 15 | | | |

DIMENSION TABLE (N=18)

900

$v_1 = v_3 + v_5$
$v_3 = \dfrac{3}{2} \cdot v_5$
$v_6 = v_2 + v_4$
$v_2 = 2 \cdot v_4$
$v_{13} = v_{14} = v_{15} = v_{16} = v_{17} = v_{18}$ COLUMN VECTOR: $v_1$  $v_2$  ...

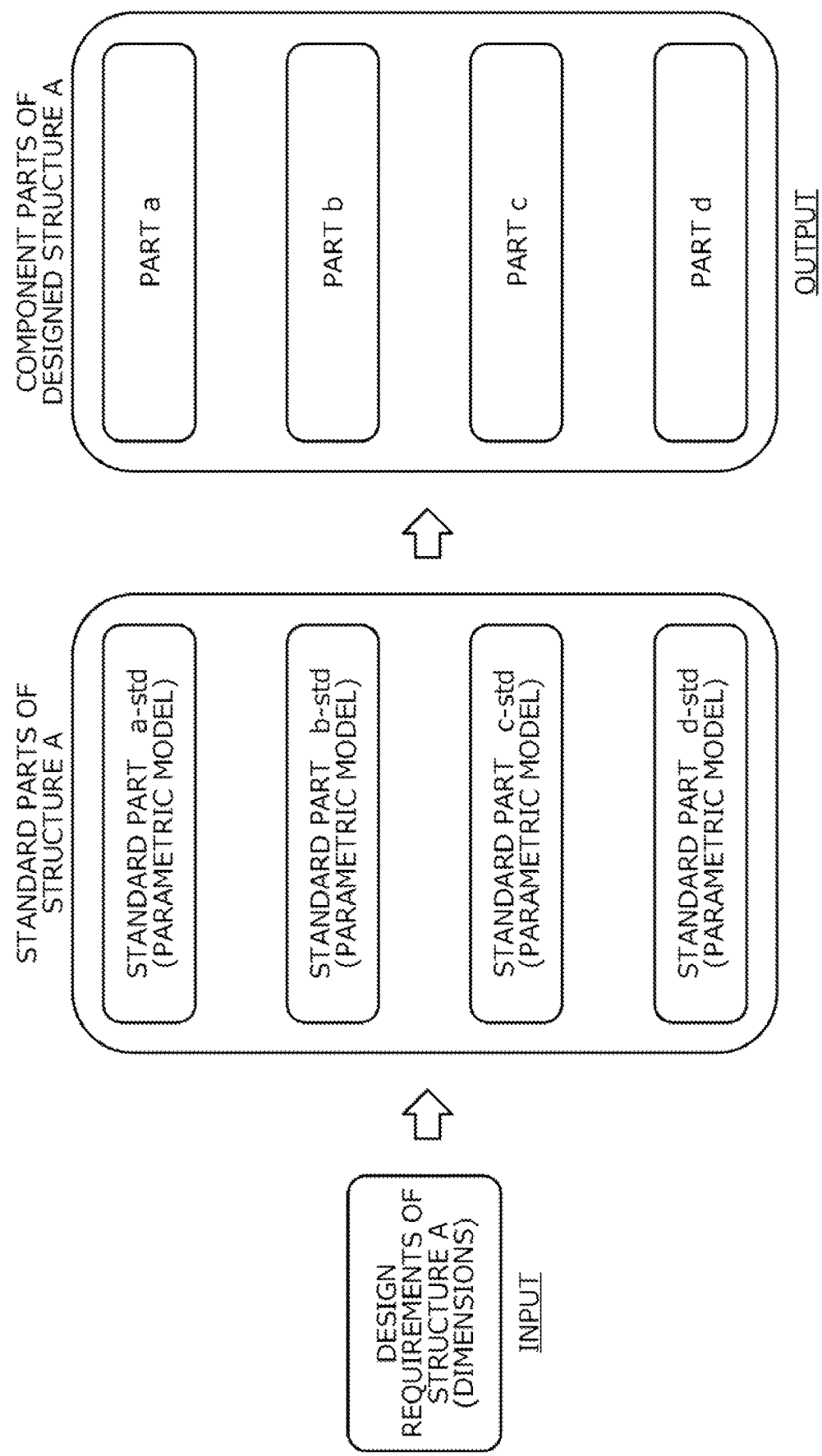

STORAGE MEDIUM, SHAPE DATA OUTPUT METHOD, AND INFORMATION PROCESSING DEVICE

CROSS-REFERENCE TO RELATED APPLICATION

This application is based upon and claims the benefit of priority of the prior Japanese Patent Application No. 2020-185727, filed on Nov. 6, 2020, the entire contents of which are incorporated herein by reference.

FIELD

The embodiments discussed herein are related to a storage medium, a shape data output method, and an information processing device.

BACKGROUND

Conventionally, since designing and drawing of a three-dimensional (3D) shape takes a lot of man-hours, diversion design using past 3D shape data is sometimes performed. Meanwhile, the past 3D shape data is often insufficiently classified and there are a large number of similar shapes. Therefore, when newly designing a similar shape of an existing product, it is desirable to appropriately classify the past 3D shape data and standardize the design object.

As prior art, for example, there is a technique of searching for a standard part having a range of an attribute value and shape characteristic data matching an attribute value and shape characteristic data of a part to be designed, searching for a standard part having a range of an attribute value similar to the attribute value of the part to be designed and shape characteristic data similar to the shape characteristic data of the part to be designed, and searching for a case part having an attribute value similar to the attribute value of the part to be designed and shape characteristic data similar to the shape characteristic data of the part to be designed.

Furthermore, there is a technique of searching for a similar part model number associated with an extraction model number by referring to similar part data, transmitting part data of the extraction model number and part data of all the searched similar part model numbers to a user terminal, and displaying single item search result detail screen on which model numbers of parts are displayed. Furthermore, there is a technique of detecting a design process directly corresponding to extracted relationship information and a design process corresponding to another relationship information to which a design parameter included in the relationship information is further related, changing a design parameter for specifying a part shape on the basis of the plurality of design processes corresponding to the relationship information and the another relationship information, and generating the shape of the part.

Furthermore, there is a technique of executing shape recognition by determining a phase of a recognition model such as unevenness of a ridge or unevenness of a vertices in a plane, using labels assigned to the plane and the ridge of the recognition model, generating an objective function and constraints, and regulating the shape recognition of the recognition model. Furthermore, there is a technique of inputting a two-dimensional or three-dimensional shape to a computer or the like to create a shape and a dimension, and then allowing an operator to change (delete, add, modify, etc.) the shape or the dimension.

Japanese Laid-open Patent Publication No. 9-179892, International Publication Pamphlet No. WO 2017/217032, Japanese Laid-open Patent Publication No. 2006-139486, Japanese Laid-open Patent Publication No. 2004-21773, and Japanese Laid-open Patent Publication No. 3-206564 are disclosed as related art.

SUMMARY

According to an aspect of the embodiments, a non-transitory computer-readable storage medium storing a shape data output program that causes at least one computer to execute process, the process includes, normalizing each shape data of a plurality of pieces of shape data for each component in each coordinate axis direction to create unit shape data; classifying the plurality of pieces of shape data based on the created unit shape data of each of the pieces of shape data; specifying, based on dimensions of sites of each shape data in classified group, a dimensional relationship between different sites of the shape data in the group; and outputting information indicating the specified dimensional relationship in association with the unit shape data of the shape data in the group.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is an explanatory diagram (part 1) illustrating an example of content stored in a standard shape DB 230;

FIG. 9B is an explanatory diagram illustrating a construction example of a relational expression indicating a dimensional relationship among sites;

FIG. 18 is an explanatory diagram illustrating a generation example of design data.

DESCRIPTION OF EMBODIMENTS

In the prior art, when standardizing a design object, it is difficult to appropriately classify design data designed in the past and derive a dimensional relationship between sites such as sides and holes.

In one aspect, an object of the present embodiment is to appropriately classify a plurality of pieces of shape data and derive a dimensional relationship between sites.

According to one aspect of the present embodiment, an effect of appropriately classifying a plurality of pieces of shape data and deriving a dimensional relationship between sites is exerted.

Hereinafter, embodiments of a shape data output program, a shape data output method, and an information processing device according to the present embodiment will be described in detail with reference to the drawings.

Embodiment

Figure 1:
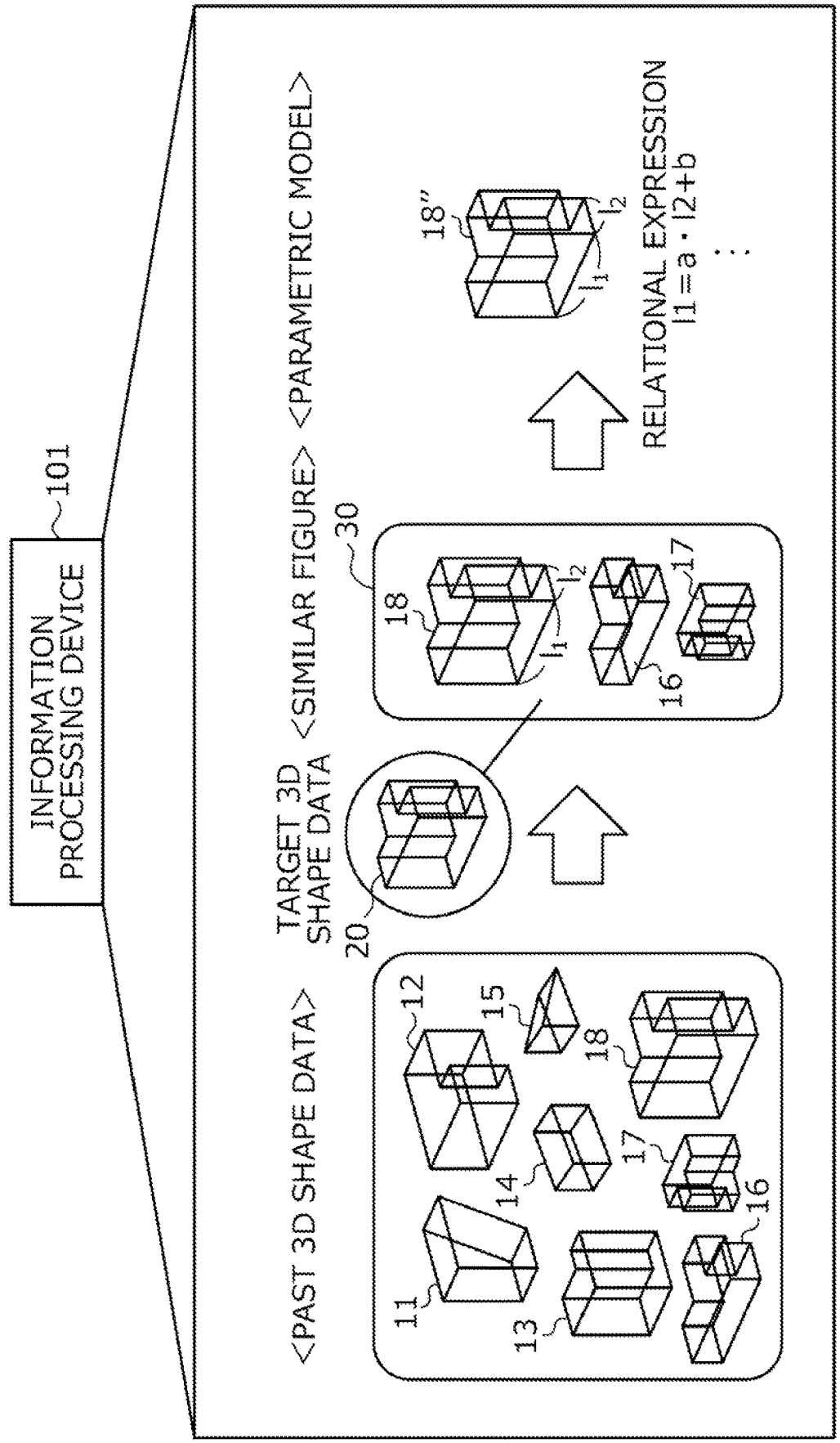
FIG. 1 is an explanatory diagram illustrating an example of a shape data output method according to an embodiment.

FIG. 1 is an explanatory diagram illustrating an example of a shape data output method according to an embodiment. In FIG. 1, an information processing device 101 is a computer that supports design of an object. The object is an object to be designed and is, for example, a three-dimensional object such as a part, a product, a construction member, or a building.

Here, since it takes a lot of man-hours to design a 3D shape, it would be very useful if a diversion design using past 3D shape data could be performed. Meanwhile, the past 3D shape data is often insufficiently classified, and there are a large number of similar shapes, so it takes time and effort to manually search for 3D shape data according to a design intent.

Therefore, when newly designing a similar shape of an existing product, it is desirable to appropriately classify the past 3D shape data and standardize the design object. For example, if the past 3D shape data can be appropriately classified and a dimensional relationship (parametric model) between sites of a 3D shape can be derived, design for regulating the 3D shape (so-called parametric design) can be performed by setting various dimensions for the model.

As a method of classifying the past 3D shape data, there is a method of comparing 3D shape data with each other to obtain a similarity, and classifying the 3D shape data on the basis of the similarity. Specifically, for example, it is conceivable to specify target 3D shape data and search for 3D shape data classified into the same group on the basis of the similarity between the 3D shape data and the target 3D shape data.

The target 3D shape data is, for example, 3D shape data for designating the design intent for the object. The design intent is, for example, a rough shape of the object (a shape for which detailed dimensions are not specified), a ratio of dimensions between some sites, a relative positional relationship of some sites, and the like.

The target 3D shape data is specified by, for example, selecting any of the 3D shape data from among the 3D shape data designed in the past. As the target, for example, 3D shape data created with a similar design intent to the object is specified among the past 3D shape data although the detailed dimensions are different from those of the object.

In this classification method, 3D shape data having the same shape as the target or a geometrically similar shape is searched. However, there are some 3D shape data having a dimensional relationship and some 3D shape data having no dimensional relationship between sites depending on the design intent although the 3D shape data have a similar shape, and not only the 3D shape data with the same shape or similar shape are always the 3D shape data to be classified into the same group.

Furthermore, it is also conceivable to manually check the past 3D shape data one by one and classify the past 3D shape data in consideration of the design intent. However, there is a problem that it takes time and effort to manually classify a huge amount of 3D shape data, which in turn increases the man-hours needed for designing the object. Moreover, it is difficult for anyone other than a designer to judge the design intent from the 3D shape data.

Therefore, in the present embodiment, a shape data output method for constructing a parametric model by classifying a plurality of pieces of shape data on the basis of unit shape data obtained by normalizing each shape data, and specifying a dimensional relationship between sites in the shape data classified by the unit shape data will be described. The parametric model is information indicating the dimensional relationship between sites in a shape classified by the unit shape data, corresponding to the unit shape data. Here, a processing example of the information processing device 101 will be described.

(1) The information processing device 101 normalizes each shape data of a plurality of pieces of shape data for each component in each coordinate axis direction to create unit shape data. Here, the shape data is information representing a shape of a design object, and includes, for example, position information, surface information, hole information, and the like of each characteristic point of the design object. The characteristic points are, for example, a vertex of the design object, a center point of a hole, and the like.

The position information of the characteristic point indicates, for example, a coordinate of the characteristic point in a rectangular coordinate system. The surface information of the characteristic point is, for example, Information for specifying a surface to which the characteristic point belongs. The hole information of the characteristic point is, for example, information for specifying the shape, size, and the like of the hole to which the characteristic point belongs. The shape data may include, for example, color information, material information, and the like of each surface.

The shape data is, for example, three-dimensional shape data. More specifically, for example, the shape data is design data designed in the past using three-dimensional computer aided design (CAD). Note that the shape data may be two-dimensional shape data.

Normalizing the shape data for each component in each coordinate axis direction means converting the shape data while maintaining the dimensional relationship between sites in each coordinate axis direction (for example, x-axis, y-axis, or z-axis direction). Taking the x-axis direction as an example, for example, the shape data is converted while maintaining the dimensional relationship between sites in the x-axis direction by dividing an x-coordinate value of each vertex of the shape data by a maximum value of coordinates in the x-axis direction of the shape data after moving the shape data to the origin.

In the example of FIG. 1, 3D shape data 11 to 18 designed in the past are displayed as the plurality of pieces of shape data. Each of the 3D shape data 11 to 18 represents the shape of each design object in a three-dimensional space. In this case, the information processing device 101 normalizes the 3D shape data 11 to 18 for each component in each coordinate axis direction to create the unit shape data, for example.

(2) The information processing device 101 classifies the plurality of pieces of shape data on the basis of the created unit shape data of each shape data. Specifically, for example, the information processing device 101 calculates a similarity between the pieces of unit shape data of the respective pieces of shape data. Any existing technique may be used to calculate the similarity between the pieces of unit shape data.

For example, the similarity between the pieces of unit shape data may be calculated from a result of comparing images obtained by capturing the unit shape data from a plurality of directions between the pieces of unit shape data. Then, the information processing device 101 classifies the plurality of pieces of shape data such that pieces of the shape data corresponding to a combination of the pieces of unit shape data in which the calculated similarity is equal to or larger than a threshold value belong to a same group.

That is, the information processing device 101 compares the unit shape data of the shape data, and classifies pieces of the shape data having similar unit shape data into the same group. By classifying the shape data on the basis of the normalized unit shape data, not only the same shape or similar shapes but also shapes with partially different dimensions (for example, vertical and horizontal dimensions are the same but depth dimensions are different) are also classified into the same group.

The example of FIG. 1 assumes a case in which target 3D shape data 20 is specified, and the 3D shape data 16 to 18 are classified into a same group 30 as similar figures of the target 3D shape data 20 from the 3D shape data 11 to 18. The pieces of 3D shape data 16 to 18 are a set of pieces of 3D shape data in which the similarity between the pieces of unit 3D shape data is equal to or larger than a threshold value between the pieces of 3D shape data 16 to 18 and the target 3D shape data 20.

Note that, here, the case of designating the target 3D shape data has been described as an example but the present embodiment is not limited to the case. For example, the information processing device 101 may identify a unit 3D shape data group in which the similarity between the respective pieces of unit 3D shape data is equal to or larger than a threshold value, and classify the 3D shape data corresponding to each unit 3D shape data of the unit 3D shape data group into the same group.

(3) The information processing device 101 specifies a dimensional relationship between different sites of the shape data in the group on the basis of the dimensions of sites of the shape data in the classified group. Here, a site of the shape data is a partial shape represented by the shape data. The site is, for example, a side. The dimension of the site is, for example, a length of the side.

The pieces of shape data classified into the same group have similar unit shape data (normalized shapes are substantially the same) and have sites corresponding to each other, respectively. For example, each vertex and each side of the 3D shape data 16 in the group 30 correspond to each vertex and each side of the other 3D shape data 17 and 18 in the group 30.

The information processing device 101 derives a relationship between a certain site and another site by a method such as regression analysis on the basis of the dimensions of the sites of the shape data in the group. Specifically, for example, the information processing device 101 creates a relational expression indicating a dimensional relationship between different sites, using one of the plurality of sites in each shape data as an objective variable and another site as an explanatory variable.

In the example of FIG. 1, as one of the relational expressions created on the basis of the dimensions of the sides of the 3D shape data 16 to 18 classified into the same group, the relational expression "$l_1 = a \cdot l_2 + b$" indicating the dimensional relationship between a side $l_1$ and a side $l_2$ in the 3D shape data 18 (a and b are coefficients) is illustrated. This relational expression "$l_1 = a \cdot l_2 + b$" is one of parametric models of the 3D shape classified by the unit 3D shape data of the 3D shape data 18.

Note that each side of the 3D shape data corresponds to each side of the unit 3D shape data of the 3D shape data. For example, the side $l_1$ and the side $l_2$ in the 3D shape data 18 correspond to any sides in the unit 3D shape data of the 3D shape data 18. Which side in the unit shape data each variable (parameter) included in the relational expression corresponds to is specifiable.

(4) The information processing device 101 outputs information indicating the specified dimensional relationship between different sites of the shape data in association with the unit shape data of the shape data in the group. Specifically, for example, the information processing device 101 may output the unit shape data to which the dimensional relational expression between sites is given, as the shape data to be used for a new design regarding the object.

In the example of FIG. 1, taking the 3D shape data 18 as an example, unit 3D shape data 18' to which 'the dimensional relational expression (for example, the relational expression "$l_1 = a \cdot l_2 + b$") between different sites in the 3D shape data 18 is given is output. The unit 3D shape data 18" is the unit 3D shape data of the 3D shape data 18.

In this way, according to the information processing device 101, the parametric model (the dimensional relationship between sites) of the shapes classified by the unit shape data can be construct. This enables parametric design and reduces the man-hours needed for design. For example, at the time of newly designing the object, by setting the dimensions of the sites according to the parametric model on the basis of the unit shape data, design data can be easily generated (parametric design).

In the example of FIG. 1, the object can be designed on the basis of the unit 3D shape data 18" to which the dimensional relational expression between sites (for example, the relational expression "$l_1 = a \cdot l_2 + b$") is given. For example, when newly designing the object, the designer can generate the design data according to the design intent by converting the dimensions of the sites to satisfy the relational expression on the basis of the unit 3D shape data 18" by designating the design requirements (for example, detailed dimensions).

(System Configuration Example of Information Processing System 200)

Next, a system configuration example of an information processing system 200 including the information processing device 101 will be described. In the following description, "3D (three-dimensional) shape data" will be described as an example of the shape data. The information processing system 200 is applied to, for example, a computer system that supports design of 3D shapes regarding products and buildings.

Figure 2:
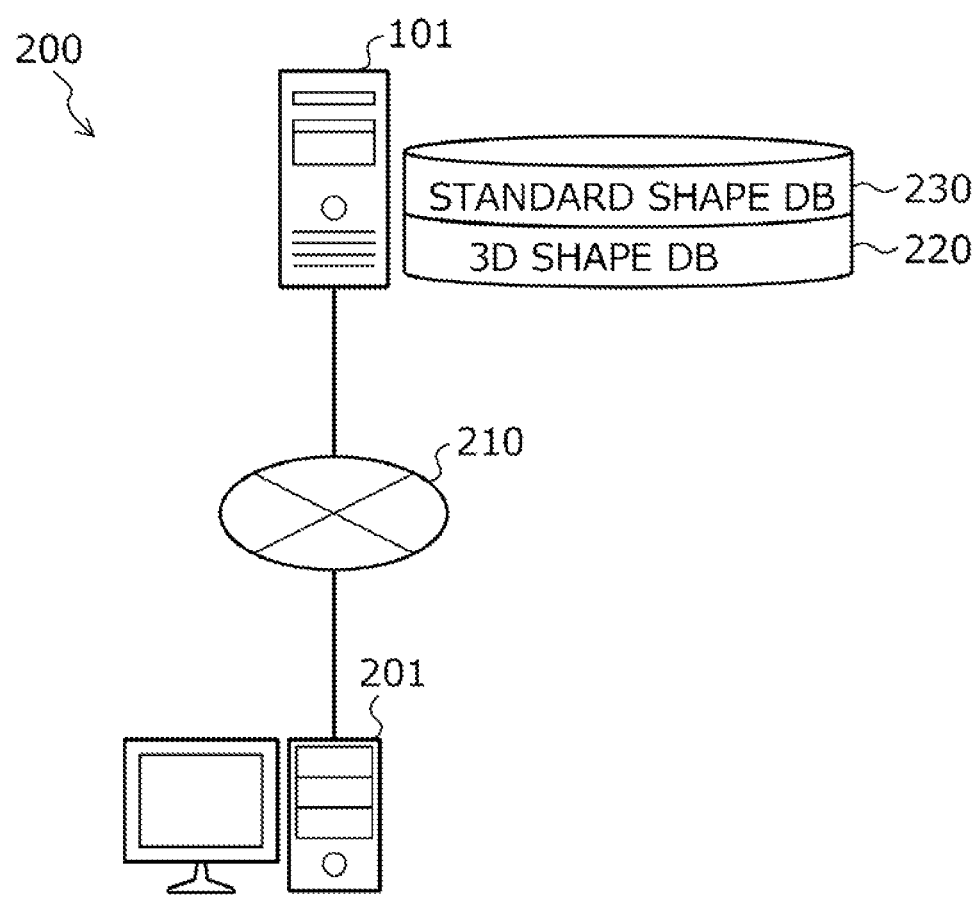
FIG. 2 is an explanatory diagram illustrating a system configuration example of an information processing system 200.

FIG. 2 is an explanatory diagram illustrating a system configuration example of the information processing system 200. In FIG. 2, the information processing system 200 includes the information processing device 101 and a client device 201. In the information processing system 200, the information processing device 101 and the client device 201 are connected via a wired or wireless network 210. The network 210 is, for example, the Internet, a LAN, a wide area network (WAN), or the like.

Here, the information processing device 101 includes a 3D shape database (DB) 220 and a standard shape DB 230. The information processing device 101 is, for example, a server. The 3D shape DB 220 is a database that stores 3D shape data designed in the past. The standard shape DB 230 is a database that stores standard shape data. Content stored in the 3D shape DB 220 and the standard shape DB 230 will be described below with reference to FIGS. 4 and 5.

The client device 201 is a computer used by a user. Examples of the client device 201 include a personal computer (PC), a tablet PC, or the like. The user is, for example, a designer who designs an object.

Note that, in the example in FIG. 2, only one client device 201 is illustrated, but the number of client devices 201 is not limited to this example. For example, the information processing system 200 may include a plurality of the client devices 201. Furthermore, the information processing device 101 is provided separately from the client device 201 but the present embodiment is not limited to the case. For example, the information processing device 101 may be implemented by the client device 201.

Hardware Configuration Example of Information Processing Device 101)

Figure 3:
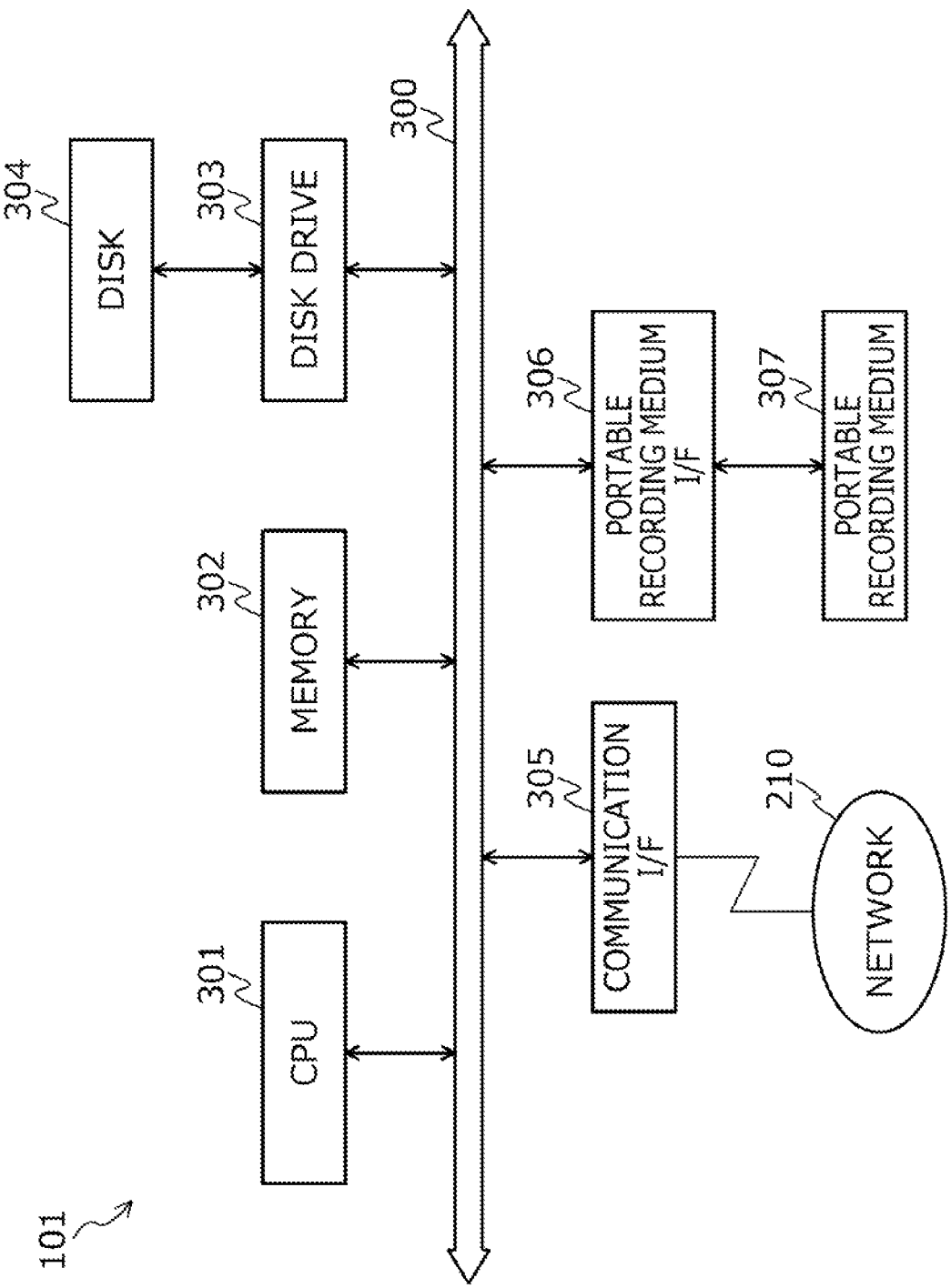
FIG. 3 is a block diagram illustrating a hardware configuration example of an information processing device 101.

FIG. 3 is a block diagram illustrating a hardware configuration example of the information processing device 101. In FIG. 3, the information processing device 101 includes a central processing unit (CPU) 301, a memory 302, a disk drive 303, a disk 304, a communication interface (I/F) 305, a portable recording medium I/F 306, and a portable recording medium 307. Furthermore, the configuration units are connected to each other by a bus 300.

Here, the CPU 301 performs overall control of the information processing device 101. The CPU 301 may have multiple cores. The memory 302 has a read only memory (ROM), a random access memory (RAM), a flash ROM, and the like, for example. Specifically, the flash ROM stores operating system (OS) programs, the ROM stores application programs, and the RAM is used as a work area for the CPU 301, for example. The programs stored in the memory 302 are loaded into the CPU 301 to cause the CPU 301 to execute coded processing.

The disk drive 303 controls reading and writing of data from and into the disk 304, under the control of the CPU 301. The disk 304 stores data written under the control of the disk drive 303. The disk 304 may be a magnetic disk, an optical disk, or the like, for example.

The communication I/F 305 is connected to the network 210 through a communication line and is connected to an external computer (for example, the client device 201 illustrated in FIG. 2) via the network 210. Further, the communication I/F 305 then manages an interface between the network 210 and the inside of the device, and controls input and output of data from an external computer. For example, a modem, a LAN adapter, or the like can be employed as the communication I/F 305.

The portable recording medium I/F 306 controls read and write of data from and into the portable recording medium 307 under the control of the CPU 301. The portable recording medium 307 stores data written under the control of the portable recording medium I/F 306. Examples of the portable recording medium 307 include a compact disc (CD)-ROM, a digital versatile disk (DVD), a universal serial bus (USB) memory, and the like.

Note that the information processing device 101 may not include, for example, the disk drive 303, the disk 304, the portable recording medium I/F 306, and the portable recording medium 307 among the above-described configuration units. Furthermore, the information processing device 101 may include, for example, a display, an input device, and the like, in addition to the above-described configuration units. Furthermore, the client device 201 illustrated in FIG. 2 can be implemented by a hardware configuration similar to that of the information processing device 101.

(Content Stored in Various DBs 220 and 230)

Next, content stored in various DBs 220 and 230 included in the information processing device 101 will be described with reference to FIGS. 4 and 5. The DBs 220 and 230 are implemented by, for example, a storage device such as the memory 302, the disk 304, or the like illustrated in FIG. 3.

Figure 4:
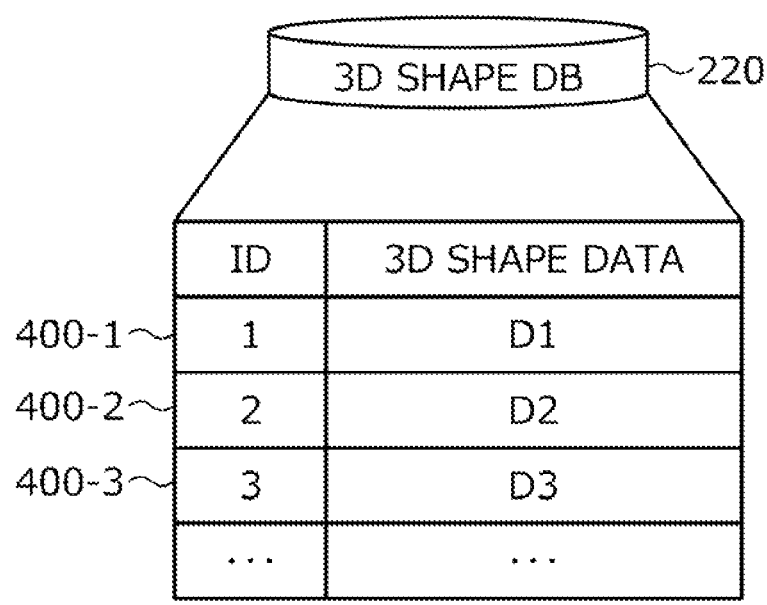
FIG. 4 is an explanatory diagram illustrating an example of content stored in a 3D shape DB 220.

FIG. 4 is an explanatory diagram illustrating an example of content stored in a 3D shape DB 220. In FIG. 4, the 3D shape DB 220 has fields for id and 3D shape data, and stores 3D shape management information (for example, 3D shape management information 400-1 to 400-3) as records by setting information in each field.

Here, id is an identifier that uniquely identifies the 3D shape data. The 3D shape data is 3D shape data designed in the past. Here, for convenience of description, the 3D shape data are described as "D1, D2, D3, . . . ". For example, the 3D shape management information 400-1 indicates the 3D shape data D1 with the id "1".

FIG. 5 is an explanatory diagram (part 1) illustrating an example of content stored in a standard shape DB 230. In FIG. 5, the standard shape DB 230 has fields for id, standard shape data, relational expression, and similar shape list, and stores standard shape management information (for example, standard shape management information 500-1 and 500-2) as records by setting information in each field.

Here, the id is an id of the 3D shape data that is the source of creating the standard shape data. The standard shape data is unit 3D shape data registered as standard shape data. The relational expression is a mathematical expression indicating the dimensional relationship between different sites (for example, sides) in the 3D shape data that is the source of creating the standard shape data.

Here, Re ##represents a different mathematical expression (##is a number), respectively. Each mathematical expression indicates, for example, the dimensional relationship between different sides in the 3D shape data. The similar shape list is a list of ids of the 3D shape data classified into the same group on the basis of the standard shape data (unit 3D shape data).

For example, the standard shape management information 500-1 indicates standard shape data D1" corresponding to the 3D shape data D1 with the id "1", the relational expression {Re11, Re12, . . . } and a similar shape list {1,7,18,21,33}. Note that a variable representing each site in the standard shape data (unit shape data) correspond to a variable in the relational expression. That is, which site in the standard shape data (unit shape data) each variable included in the relational expression corresponds to is specifiable.

(Exemplary Functional Configuration of Information Processing Device 101)

Figure 6:
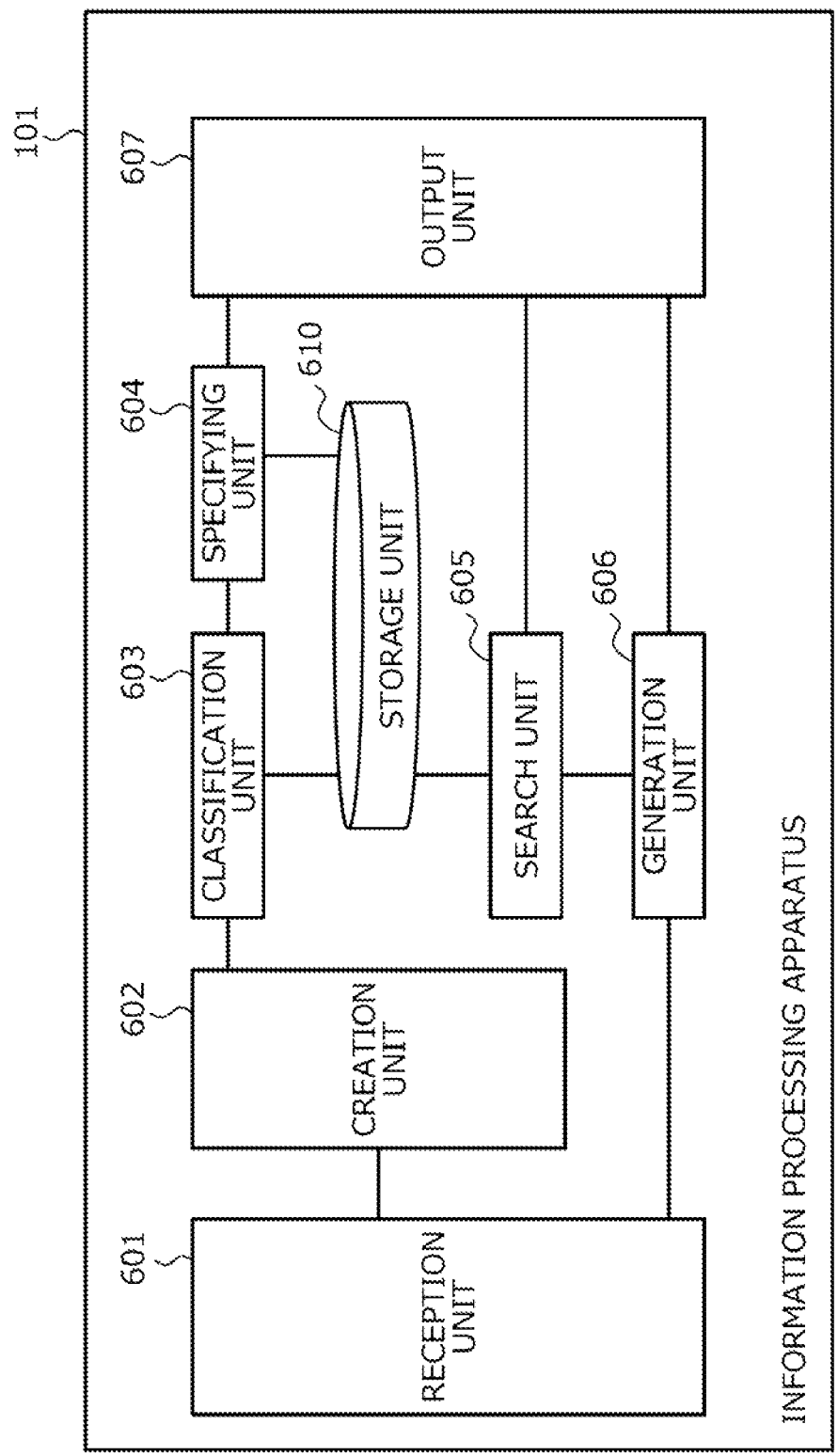
FIG. 6 is a block diagram illustrating a functional configuration example of the information processing device 101.

FIG. 6 is a block diagram illustrating an exemplary functional configuration of the information processing device 101. In FIG. 6, the information processing device 101 includes a reception unit 601, a creation unit 602, a classification unit 603, a specifying unit 604, a search unit 605, a generation unit 606, an output unit 607, and a storage unit 610. The reception unit 601 to the output unit 607 have functions serving as a control unit; for example, the functions of these units are implemented by the CPU 301 executing the program stored in a storage device such as the memory 302, the disk 304, or the portable recording medium 307 or by the communication I/F 305 illustrated in FIG. 3. The processing results of each functional unit are stored into a storage device such as the memory 302 or the disk 304, for example. Furthermore, the storage unit 610 is implemented by a storage device such as the memory 302 or the disk 304, for example. Specifically, for example, the storage unit 610 stores the 3D shape DB 220 illustrated in FIG. 4 and the standard shape DB 230 illustrated in FIG. 5.

The reception unit 601 receives designation of the target 3D shape data. The target 3D shape data is, for example, 3D shape data for designating the design intention for the object, and is designated from the 3D shape data stored in the 3D shape DB 220. Furthermore, the target 3D shape data may be 3D shape data in a state where basic design (designed with rough dimensions) for the object is completed.

Specifically, for example, the reception unit 601 receives designation of the target 3D shape data by receiving designation of the id of any of the 3D shape data stored in the 3D shape DB 220 from the client device 201. Furthermore, the reception unit 601 may receive the target 3D shape data itself from the client device 201.

The creation unit 602 normalizes each 3D shape data of a plurality of 3D shape data for each component in each coordinate axis direction to create the unit 3D shape data. Specifically, for example, the creation unit 602 extracts the minimum value in each coordinate axis direction from the coordinates of each characteristic point of each 3D shape data. The characteristic points are, for example, a vertex of the design object, a center point of a hole, and the like.

Then, the creation unit 602 subtracts the extracted minimum value in each coordinate axis direction from each value of the coordinates of each characteristic point. Next, the creation unit 602 extracts the maximum value in each coordinate axis direction from the coordinates of each characteristic point after subtraction. Then, the creation unit 602 creates the unit 3D shape data of each 3D shape data by dividing each value of the coordinates of each characteristic point after subtraction by the extracted maximum value in each coordinate axis direction.

Here, a creation example of the unit 3D shape data will be described with reference to FIG. 7. In the following description, any 3D shape data among a plurality of 3D shape data may be referred to as "3D shape data Di" (where i is a natural number of 1 or larger).

Figure 7:
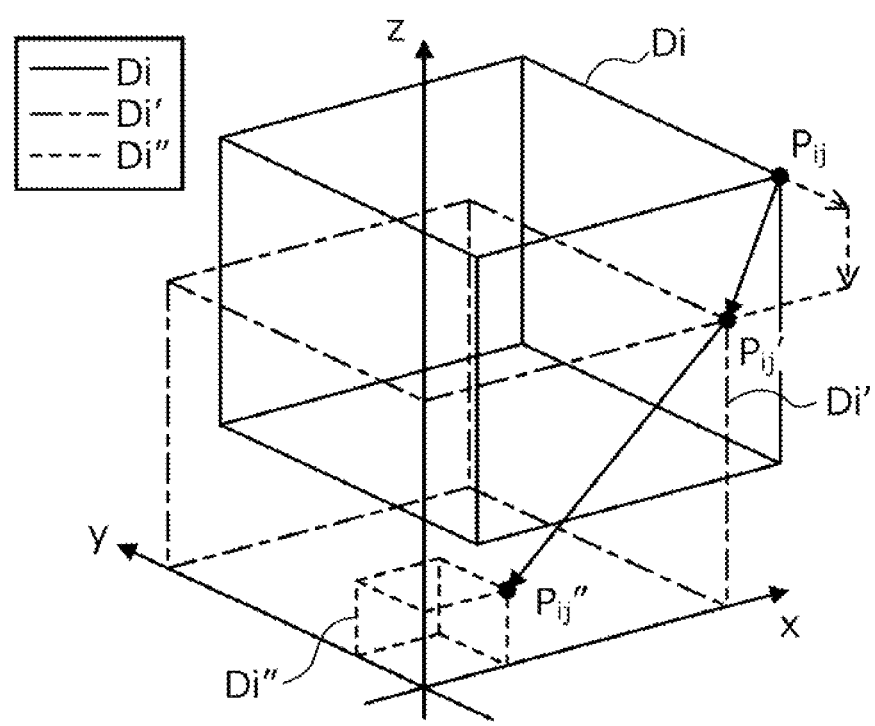
FIG. 7 is an explanatory view illustrating a creation example of unit 3D shape data.

FIG. 7 is an explanatory view illustrating a creation example of unit 3D shape data. In FIG. 7, the coordinates of each vertex j of the 3D shape data Di (solid line in FIG. 7) are $P_{ij}$ ($x_{ij}$, $y_{ij}$, $z_{ij}$) (j=1, 2, ..., J). Here, a case where the 3D shape data Di is a "rectangular parallelepiped" will be described as an example. Furthermore, the characteristic point of the 3D shape data Di is defined as the "vertex".

First, the creation unit 602 extracts the minimum value in each coordinate axis direction from the coordinates of each vertex j of the 3D shape data Di. Then, the creation unit 602 translates the 3D shape data Di by subtracting the extracted minimum value in each coordinate axis direction from each value of the coordinates $P_{ij}$ of each vertex j. The new 3D shape data (one-dot chain line in FIG. 7) obtained here is "Di'", and the coordinates of each vertex is $P_{ij}'$ ($x_{ij}'$, $y_{ij}'$, $z_{ij}'$).

$x_{ij}'$, $y_{ij}'$, and $z_{ij}'$ are expressed by the following expressions (1) to (3): where "i, j, J∈natural number" and "$x_{ij}$, $y_{ij}$, $z_{ij}$>0".

$$x_{ij}'=x_{ij}-\text{Min}([x_{i1},x_{i2},\ldots,x_{iJ}]) \tag{1}$$

$$y_{ij}'=y_{ij}-\text{Min}([y_{i1},y_{i2},\ldots,y_{iJ}]) \tag{2}$$

$$z_{ij}'=z_{ij}-\text{Min}([z_{i1},z_{i2},\ldots,z_{iJ}]) \tag{3}$$

Next, the creation unit 602 extracts the maximum value in each coordinate axis direction from the coordinates $P_{ij}'$ of each vertex. Then, the creation unit 602 divides each value of the coordinates $P_{ij}'$ of each vertex by the extracted maximum value in each coordinate axis direction to create the normalized unit 3D shape data. The unit D shape data (dotted line in FIG. 7) obtained here is "Di''", and the coordinates of each vertex are Pij'' ($x_{ij}''$, $y_{ij}''$, $z_{ij}''$).

$x_{ij}''$, $y_{ij}''$, and $z_{ij}''$ are expressed by the following expressions (4) to (6).

$$x_{ij}''=x_{ij}'/\text{Max}([x_{i1}',x_{i2}',\ldots,x_{iJ}']) \tag{4}$$

$$y_{ij}''=y_{ij}'/\text{Max}([y_{i1}',y_{i2}',\ldots,y_{iJ}']) \tag{5}$$

$$z_{ij}''=z_{ij}'/\text{Max}([z_{i1}',z_{i2}',\ldots,z_{iJ}']) \tag{6}$$

Returning to the description of FIG. 6, the classification unit 603 classifies a plurality of 3D shape data on the basis of the unit 3D shape data of each created 3D shape data. Specifically, for example, the classification unit 603 calculates the similarity between the pieces of unit 3D shape data of respective pieces of 3D shape data. Next, the classification unit 603 specifies a combination of the pieces of unit 3D shape data in which the calculated similarity is equal to or larger than a threshold value.

Then, the classification unit 603 classifies the plurality of 3D shape data such that pieces of the 3D shape data corresponding to the respective pieces of unit 3D shape data included in the specified combination of the pieces of unit 3D shape data belong to the same group. The threshold value can be arbitrarily set. For example, the threshold value is set to a value in which the unit 3D shape data can be determined to match each other if the similarity is equal to or larger than the threshold value.

More specifically, for example, the classification unit 603 compares the unit 3D shape data of the designated target 3D shape data with the unit 3D shape data of each 3D shape data in the 3D shape DB 220, and calculates the similarity between the pieces of unit 3D shape data. For example, the classification unit 603 compares images obtained by capturing each unit 3D shape data from a plurality of directions between the pieces of unit 3D shape data, and calculates the similarity between the images. Then, the classification unit 603 calculates the similarity between the pieces of unit 3D shape data by accumulating the calculated similarity between the images.

Then, the classification unit 603 classifies the 3D shape data corresponding to the combination of the pieces of unit 3D shape data in which the calculated similarity is equal to or larger than the threshold value to the same group. As a result, 3D shape data having similar unit 3D shape data to the target 3D shape data can be extracted from the 3D shape DB 220.

Here, a classification example of the 3D shape data will be described with reference to FIG. 8.

Figure 8:
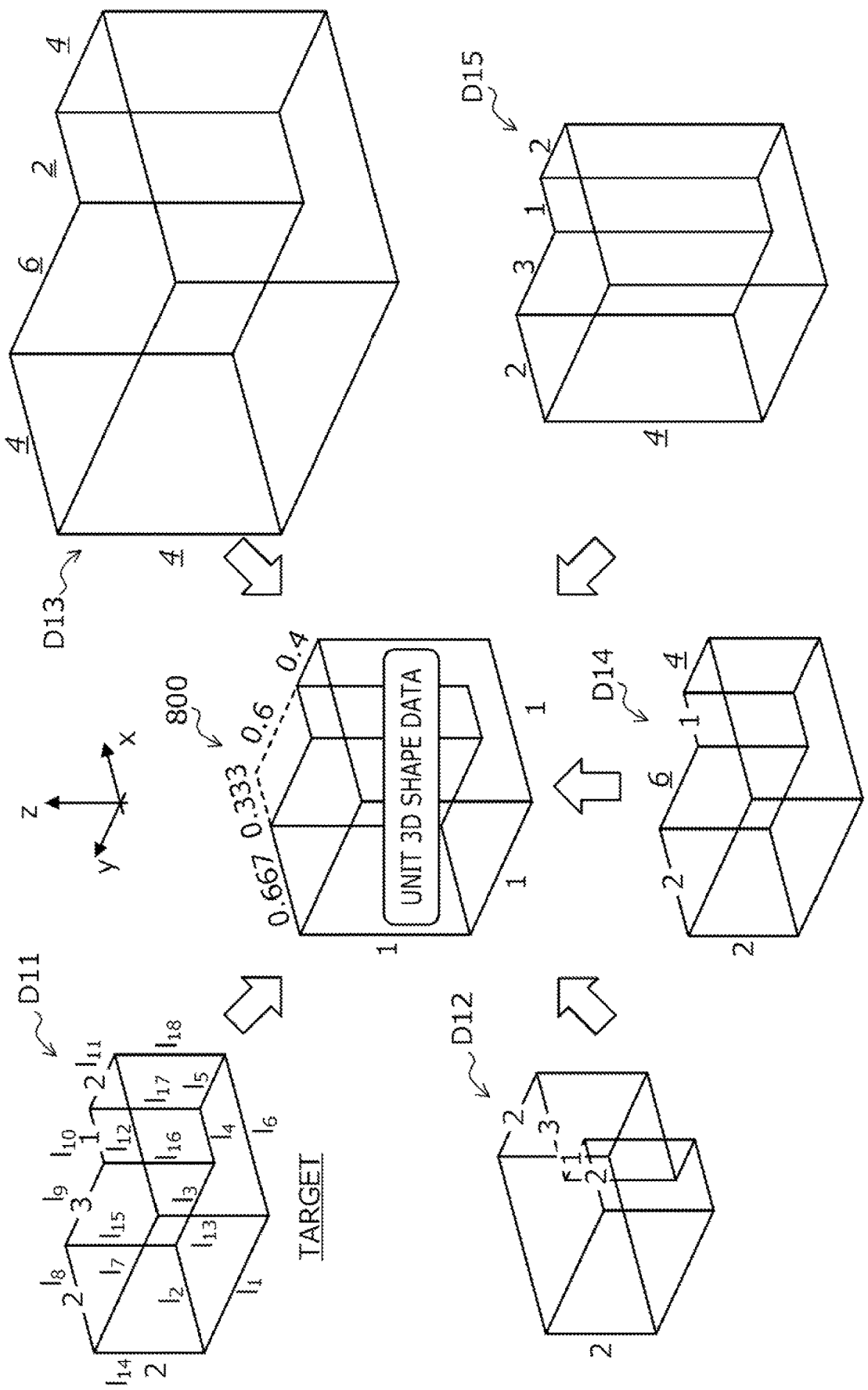
FIG. 8 is an explanatory view illustrating a classification example of 3D shape data.

FIG. 8 is an explanatory view illustrating a classification example of the 3D shape data. In FIG. 8, 3D shape data D11 to D15 are displayed. The 3D shape data D11 is the target 3D shape data. The 3D shape data D12 is 3D shape data having a different orientation from the target 3D shape data D11.

The 3D shape data D13 is 3D shape data having a similar relationship with the target 3D shape data D11. The 3D shape data D14 and D15 are 3D shape data having a partially different length from the target 3D shape data D11. In FIG. 8, $l_1$ to $l_{18}$ in the 3D shape data D11 represent sides in the 3D shape data D11. Furthermore, numerical values in the 3D shape data D11 to D15 represent dimensions of the sides.

Here, when each of the 3D shape data D11 to D15 is normalized for each component in each coordinate axis direction as described with reference to FIG. 7, unit 3D shape data 800 (corresponding to 3D shape data D11" to D15") having the same shape is created. In this case, the 3D shape data D11 to D15 are classified into the same group.

In this way, by determining the similarity on the basis of the unit 3D shape data, it is possible to classify those with the same side ratio in each coordinate axis direction, and not only the same shape as or similar shape to the target but also shapes having partially different lengths can be classified into the same group.

Returning to the description of FIG. 6, the specifying unit 604 specifies the dimensional relationship between different sites of the 3D shape data in the group on the basis of the dimensions of sites of the 3D shape data in the classified group. Here, the site of the 3D shape data is a site of the design object indicated by the 3D shape data, and is a site representing a characteristic of the design object such as a side or a hole, for example. Furthermore, the dimension of the site is, for example, the length of the side, the diameter of the hole, or the like.

Specifically, for example, the specifying unit 604 creates a vector having the dimension in each 3D shape data of the site as an element, for each site in each 3D shape data in the group. Then, the specifying unit 604 creates a relational expression indicating a dimensional relationship between different sites on the basis of the created vector for each site, using one of the plurality of sites in each 3D shape data as an objective variable and another site as an explanatory variable. The dimensional relationship between different sites can be constructed by, for example, a method such as linear regression analysis, non-linear regression analysis, or machine learning using a neural network.

Furthermore, the specifying unit 604 may adopt a site having a relatively high variance of the elements of the created vector as the objective variable among the plurality of sites in each 3D shape data. Thereby, the relational expression can be constructed excluding a site with an unchanged dimension among the pieces of 3D shape data in the group from the objective variable. Noted that a correlation coefficient between variables may be obtained and the variables having a relatively low correlation may be excluded.

Furthermore, the specifying unit 604 may use a site having a relatively high contribution rate to the objective variable as the explanatory variable among the plurality of sites in each 3D shape data. The contribution rate (coefficient of determination) is a value representing how much the explanatory variable can explain the objective variable. More specifically, for example, when constructing the relational expression, the specifying unit 604 selects a variable having a high contribution rate to the objective variable as the explanatory variable by a stepwise method.

Here, a construction example of the relational expression indicating the dimensional relationship between different sites in the 3D shape data will be described with reference to FIGS. 9A and 9B.

Figure 9A:
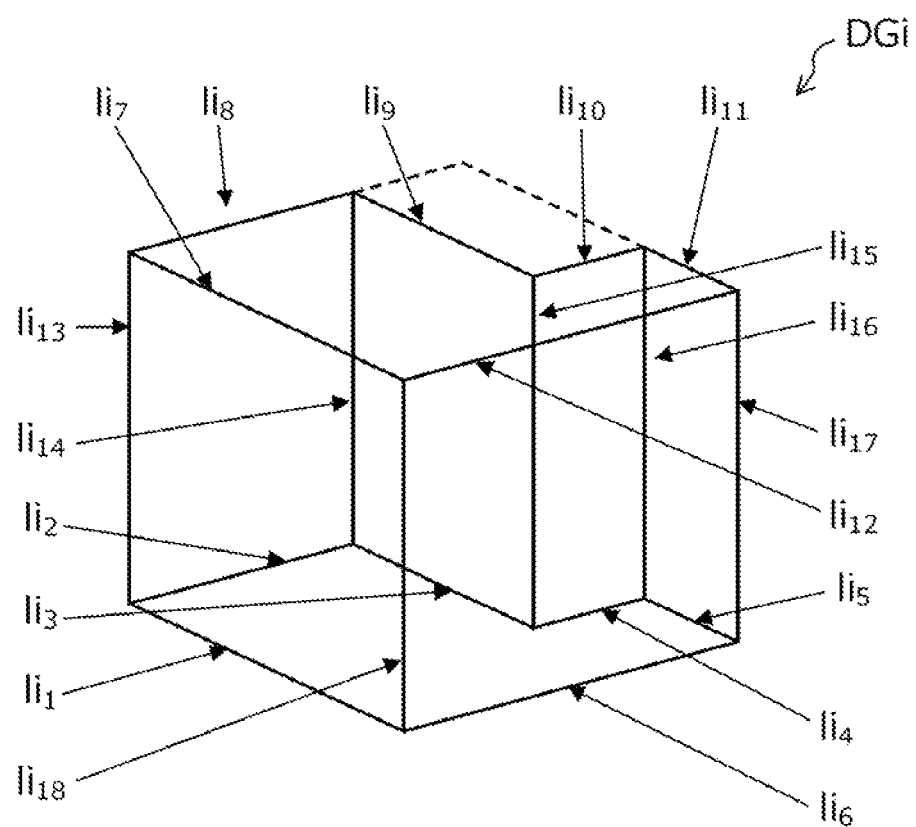
FIG. 9A is an explanatory view illustrating an example of the 3D shape data.

FIG. 9A is an explanatory view illustrating an example of the 3D shape data. FIG. 9B is an explanatory diagram illustrating a construction example of a relational expression indicating a dimensional relationship among sites. Here, 3D shape data classified into a same group Ga on the basis of the unit 3D shape data are referred to as "3D shape data $DG_1$ to $DG_M$". M represents a total number of the 3D shape data in the group Ga.

In FIG. 9A, 3D shape data DG is any of the 3D shape data $DG_1$ to $DG_M$ (i=1, 2, . . . , M). $l_{i1}$ to $l_{i18}$ in the 3D shape data $DG_i$ represent sides (sites) in the 3D shape data $DG_i$.

First, the specifying unit 604 aligns the x-axis, y-axis, and z-axis directions of the unit 3D shape data of the 3D shape data $DG_1$ to $DG_M$ classified in the group Ga. Next, the specifying unit 604 creates a dimension table 900 for each site (here, side) as illustrated in FIG. 9B by aligning the directions of the 3D shape data $DG_1$ to $DG_M$ in the group Ga on the basis of the aligned unit 3D shape data to make vertices and dimensions of the same site consistent.

In FIG. 9B, the dimension table 900 illustrates the dimensions of the sides $l_{i1}$ to $l_{iN}$ in the 3D shape data $DG_1$ to $DG_M$. Note that $l_{ij}$ represents the j-th side of the 3D shape data $DG_i$. N represents the number of sides of the 3D shape data $DG_i$. In the example of the 3D shape data $DG_i$ illustrated in FIG. 9A, "N=18".

Next, the specifying unit 604 derives the relational expression by regression analysis or the like for the dimensional relationship between sides by reference to the created dimension table 900. For example, the specifying unit 604 creates a column vector v (for example, v1, v2, . . . ) for each side in the 3D shape data $DG_i$, using the dimension in each of the 3D shape data $DG_1$ to $DG_M$ of the side as the element.

Then, the specifying unit 604 obtains the relational expression indicating the dimensional relationship between sides using variables v [v1, v2, . . . , vN]. For example, the specifying unit 604 divides the variables v into the objective variable y and the explanatory variable x to construct a regression model. For example, when constructing a regression model with vN as the objective variable y and the remaining variables as the explanatory variables xk, the regression model is expressed in the expression (7) below: where $\beta_0, \beta_1, \beta_2, \ldots$ are regression parameters.

$$y = \beta_0 + \sum_{k=1}^{N-1} \beta_k x_k \tag{7}$$

In the case of the 3D shape data $DG_i$ illustrated in FIG. 9A, the relational expressions (regression models) of the following expressions (8) to (12) can be obtained. Note that, here, since an upper surface and a lower surface have the same shape, the relationship among v7 to v12 is omitted.

$$v_1 = v_3 + v_5 \tag{8}$$

$$v_3 = \tfrac{3}{2} \cdot v_5 \tag{9}$$

$$v_6 = v_2 + v_4 \tag{10}$$

$$v_2 = 2 \cdot v_4 \tag{11}$$

$$v_{13} = v_{14} = v_{15} = v_{16} = v_{17} = v_{18} \tag{12}$$

Thereby, the parametric models (the above expressions (8) to (12)) of the shapes (3D shape data $DG_1$ to $DG_M$) classified by the unit 3D shape data $DG_i''$ of the 3D shape data $DG_i$ can be generated.

Returning to the description of FIG. 6, the output unit 607 outputs information indicating the specified dimensional relationship between sites in association with the unit shape data of the shape data in the classified group. Examples of an output method by the output unit 607 include storing the calculation result in a storage device such as the memory 302 or the disk 304, transmitting the calculation result to another computer (for example, to the client device 201 illustrated in FIG. 2) by the communication I/F 305, displaying the calculation result on a display (not illustrated), and the like.

Specifically, for example, the output unit 607 may store the information indicating the specified dimensional relationship between sites in the storage unit 610 in association with the unit 3D shape data of the 3D shape data in the group. The information indicating the dimensional relationship between sites is, for example, the relational expressions such as the above expressions (8) to (12).

More specifically, for example, the output unit 607 may store the unit 3D shape data of the 3D shape data in the group as the standard shape data in the standard shape DB 230 illustrated in FIG. 5 in association with the specified relational expression indicating the dimensional relationship between sites of the 3D shape data in the group. At this time, the output unit 607 may store information for specifying the 3D shape data classified into the same group on the basis of the standard shape data (unit 3D shape data), for example, a similar shape list together in the standard shape DB 230.

As a result, the parametric model (relational expression) of the 3D shape classified by the unit 3D shape data can be accumulated as knowledge along with the unit 3D shape data.

Furthermore, the creation unit 602 normalizes the designated target 3D shape data for each component in each coordinate axis direction to create the target unit 3D shape data.

The search unit 605 searches for first unit 3D shape data similar to the created target unit 3D shape data by reference to the storage unit 610. Specifically, for example, the search unit 605 calculates the similarity between the target unit 3D shape data and the standard shape data by reference to the standard shape DB 230. Then, the search unit 605 searches for the standard shape data having the calculated similarity equal to or larger than a threshold value.

The output unit 607 outputs the searched first unit 3D shape data and information indicating the dimensional relationship between different sites stored in the storage unit 610 in association with the first unit 3D shape data. Specifically, for example, the output unit 607 outputs the searched standard shape data and the relational expression stored in the standard shape DB 230 in association with the standard shape data.

The output destination of the standard shape data and the relational expression is, for example, the client device 201. As a result, the designer can design the object according to the relational expression (parametric relationship) on the basis of the standard shape data when newly designing the object.

Furthermore, the reception unit 601 receives designation of the design requirements for the object. Here, the design requirements for the object indicate conditions to be satisfied when designing the object, and indicates, for example, the dimension of a specific site.

The generation unit 606 generates design data for the object according to the information indicating the dimensional relationship between different sites stored in the storage unit 610 in association with the first unit 3D shape data on the basis of the searched first unit 3D shape data and the designated design requirements. In this case, the output unit 607 outputs the generated design data regarding the object.

Specifically, for example, the generation unit 606 generates the design data for the object according to the relational expression stored in the standard shape DB 230 in association with the standard shape data on the basis of the searched standard shape data and the designated design requirements.

As a result, for example, when the designer designates the dimension of a specific side of the standard shape data, dimensions of other sides having the dimensional relationship with the specific side are automatically changed according to the relational expression, and the design data for the object can be automatically generated. Note that, in the case where the design requirements contrary to the relational expression are designated, an error occurs as a requirement violation, for example.

Furthermore, the storage unit 610 may store the 3D shape data in the group in association with the unit 3D shape data of the 3D shape data in the group. In this case, the output unit 607 may output the 3D shape data in the group stored in the storage unit 610 in association with the searched first unit shape data.

Specifically, for example, first, the output unit 607 specifies the similar shape list stored in the standard shape DB 230 in association with the searched standard shape data. Next, the output unit 607 extracts the 3D shape data of the id included in the specified similar shape list from the 3D shape DB 220. Then, the output unit 607 outputs the extracted 3D shape data.

As a result, when newly designing the object, the designer can design the object by diverting the 3D shape data designed in the past, which is classified into the same group as the target on the basis of the unit 3D shape data, for example.

Furthermore, the output unit 607 may output the 3D shape data in the group stored in the storage unit 610 in association with the searched first unit shape data and the information indicating the dimensional relationship between different sites. Specifically, for example, first, the output unit 607 specifies the similar shape list stored in the standard shape DB 230 in association with the searched standard shape data. Next, the output unit 607 extracts the 3D shape data of the id included in the specified similar shape list from the 3D shape DB 220. Then, the output unit 607 outputs the extracted 3D shape data and the relational expression stored in the standard shape DB 230 in association with the searched standard shape data.

As a result, the designer can design the object according to the relational expression (parametric relationship) on the basis of the 3D shape data designed in the past when newly designing the object. Furthermore, for example, when the designer designates the dimension of a certain side of the 3D shape data designed in the past, dimensions of other sides having the dimensional relationship with the certain side are automatically changed according to the relational expression, and the design data for the object can be automatically generated.

Note that, in the above description, the standard shape DB 230 stores the unit 3D shape data for each 3D shape data classified into the same group, but the present embodiment is not limited to the case. For example, in the standard shape DB 230, only the unit 3D shape data of any of the 3D shape data classified in the same group may be registered as the standard shape data.

Here, the content stored in the standard shape DB 230 when only the unit 3D shape data of any of the 3D shape data classified into the same group is registered as the standard shape data will be described with reference to FIG. 10.

Figure 10:
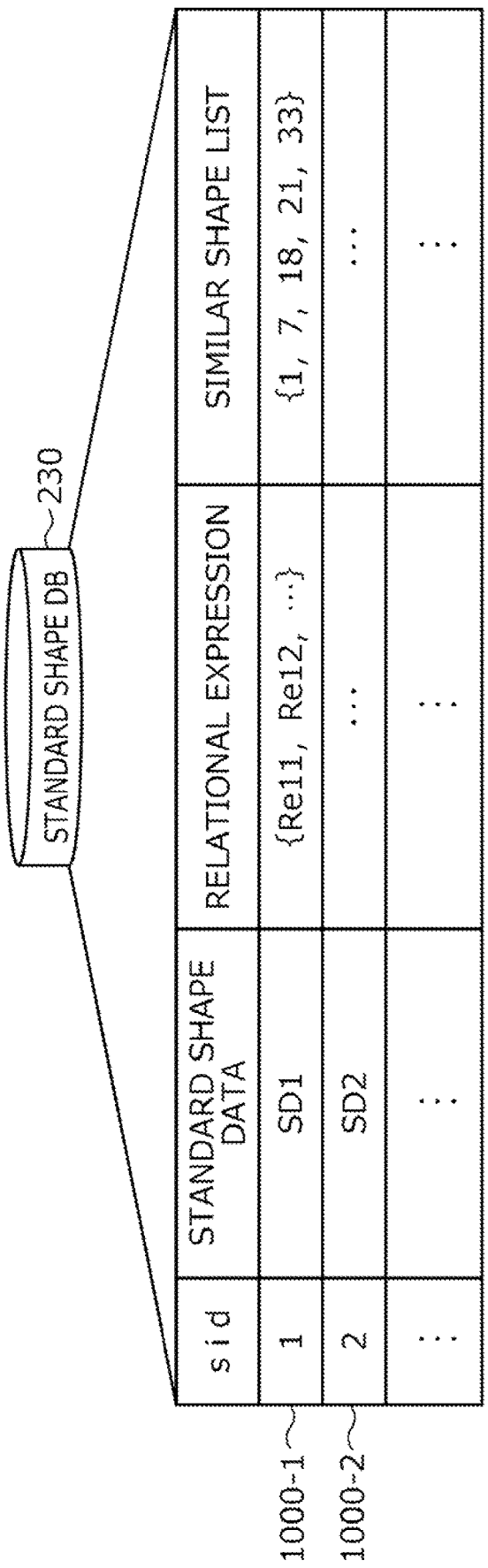
FIG. 10 is an explanatory diagram (part 2) illustrating an example of content stored in the standard shape DB 230.

FIG. 10 is an explanatory diagram (part 2) illustrating an example of content stored in the standard shape DB 230. In FIG. 10, the standard shape DB 230 has fields for sid, standard shape data, relational expression, and similar shape list, and stores standard shape management information (for example, standard shape management information 1000-1 and 1000-2) as records by setting information in each field.

Here, sid is an identifier that uniquely identifies the standard shape data. The standard shape data is unit 3D shape data registered as standard shape data. The standard shape data is the unit 3D shape data of any of the 3D shape data classified into the same group on the basis of the unit 3D shape data.

The relational expression is a mathematical expression indicating the dimensional relationship between different sites in the 3D shape data that is the source of creating the standard shape data (unit 3D shape data). The similar shape list is a list of ids of the 3D shape data classified into the same group on the basis of the standard shape data (unit 3D shape data).

For example, the standard shape management information 1000-1 indicates standard shape data SD1 of the sid "1", the relational expression {Re11, Re12, . . . } and the similar shape list {1,7,18,21,33}. In this way, by registering only the unit 3D shape data of any of the 3D shape data classified in the same group as the standard shape data, the storage amount in the standard shape DB 230 can be suppressed as compared with the case illustrated in FIG. 5.

(Various Processing Procedures of Information Processing Device 101)

Next, various processing procedures of the information processing device 101 will be described with reference to FIGS. 11 to 17. First, a preparatory processing procedure of the information processing device 101 will be described with reference to FIG. 11.

Figure 11:
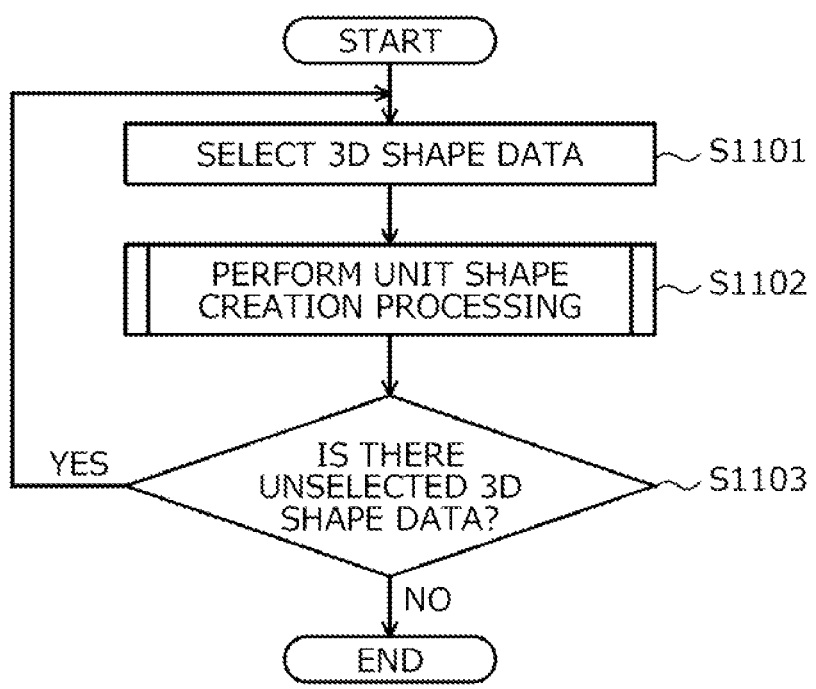
FIG. 11 is a flowchart illustrating an example of a preparatory processing procedure of the information processing device 101.

FIG. 11 is a flowchart illustrating an example of a preparatory processing procedure of the information processing device 101. In the flowchart of FIG. 11, first, the information processing device 101 selects unselected 3D shape data by reference to the 3D shape DB 220 (step S1101).

Next, the information processing device 101 executes unit shape creation processing for the selected 3D shape data (step S1102). A specific processing procedure of the unit shape creation processing will be described below with reference to FIG. 12. Then, the information processing device 101 determines whether there is unselected 3D shape data that has not been selected by reference to the 3D shape DB 220 (step S1103).

Here, in the case where there is unselected 3D shape data (step S1103: Yes), the information processing device 101 returns to step S1101. On the other hand, in the case where there is no unselected 3D shape data (step S1103: No), the information processing device 101 terminates the series of processing according to the present flowchart.

As a result, as advance preparation, the unit 3D shape data of each 3D shape data registered in the 3D shape DB 220 can be created. Note that the created unit 3D shape data may be stored in the 3D shape DB 220 in association with the 3D shape data of the creation source, for example.

Next, a specific processing procedure of the unit shape creation processing in step S1102 illustrated in FIG. 11 will be described with reference to FIG. 12.

Figure 12:
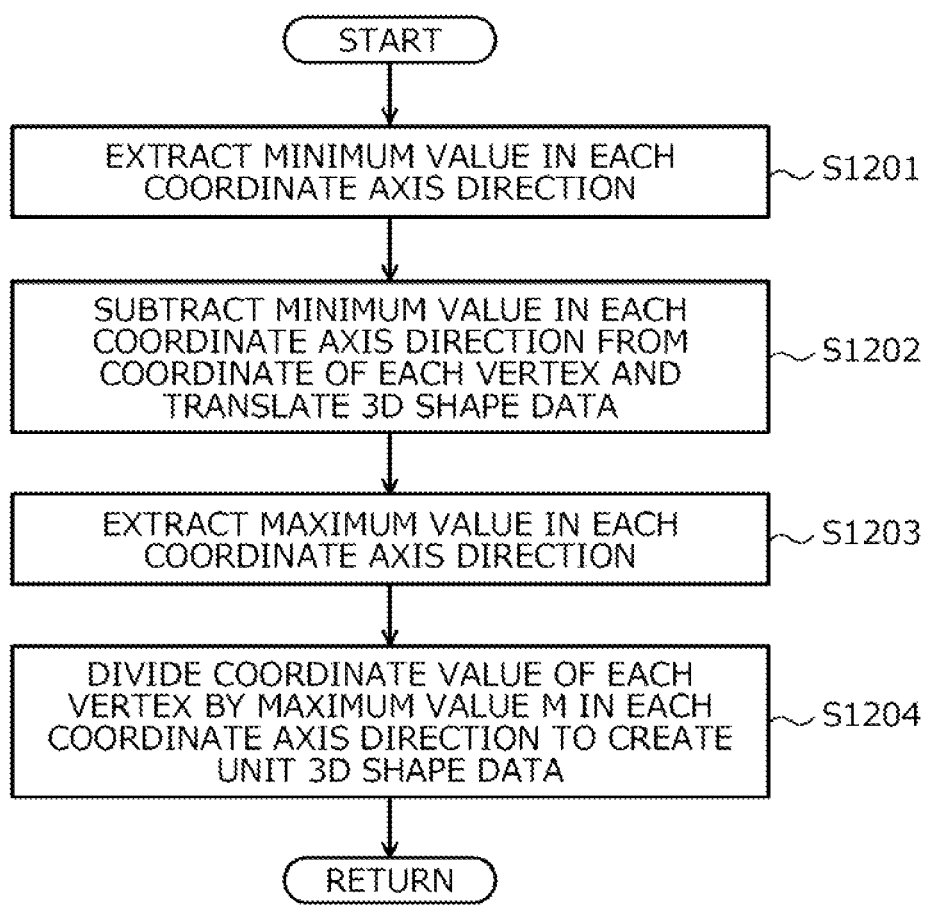
FIG. 12 is a flowchart illustrating an example of a specific processing procedure of unit shape creation processing.

FIG. 12 is a flowchart illustrating an example of a specific processing procedure of the unit shape creation processing. In the flowchart of FIG. 12, first, the information processing device 101 extracts the minimum value in each coordinate axis direction from the coordinates of each vertex of the 3D shape data (step S1201). Then, the information processing device 101 subtracts the extracted minimum value in each coordinate axis direction from each value of the coordinates of each vertex, and translates the 3D shape data (step S1202).

Next, the information processing device 101 extracts the maximum value in each coordinate axis direction from the coordinates of each vertex of the 3D shape data after translation (step S1203). Then, the information processing device 101 creates the unit 3D shape data by dividing each value of the coordinates of each vertex of the 3D shape data after translation by the extracted maximum value in each coordinate axis direction (step S1204) and return to the step in which the unit shape creation processing is called.

This allows normalization of the 3D shape data while maintaining the dimensional relationship between sites in each coordinate axis direction.

Next, a standard shape registration processing procedure of the information processing device 101 will be described with reference to FIG. 13. The standard shape registration processing is processing for pre-registering the standard shape data in the standard shape DB 230 before designing the object.

Figure 13:
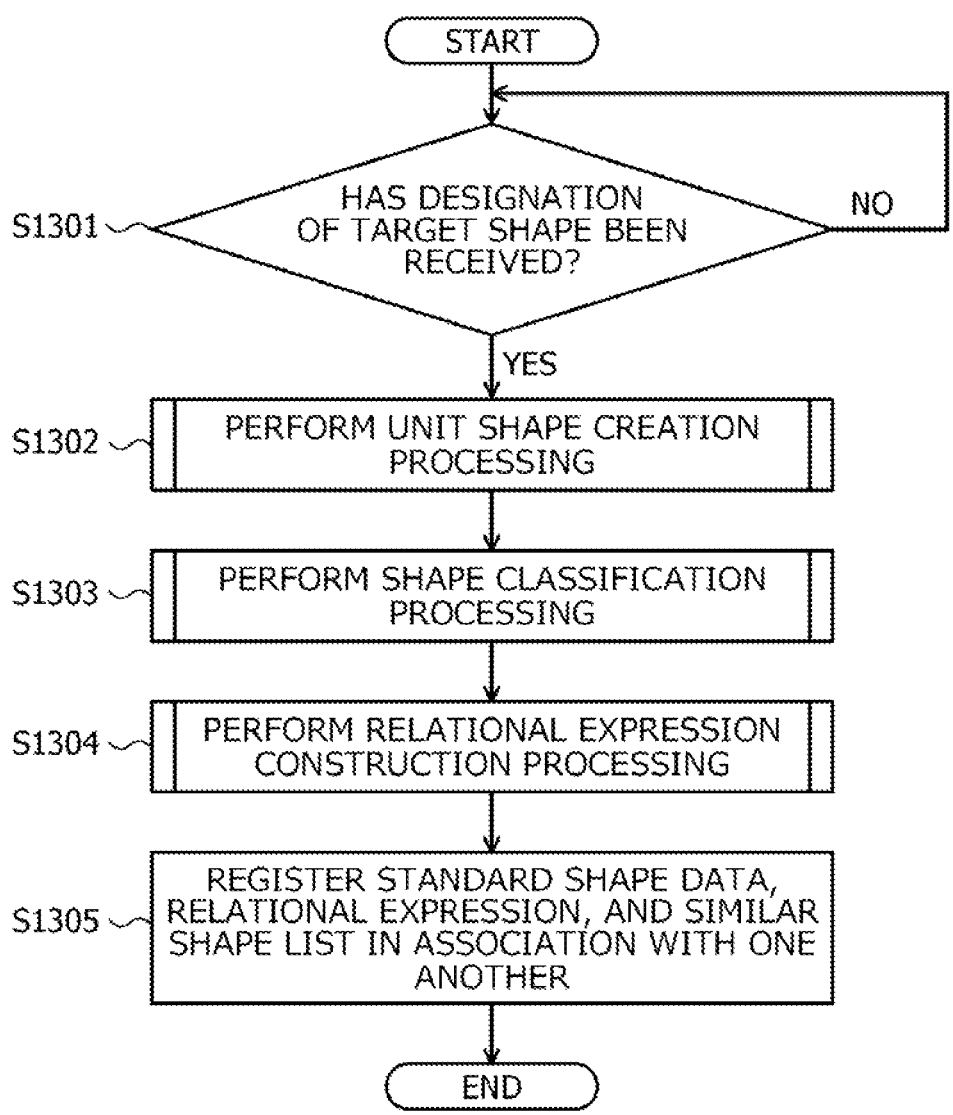
FIG. 13 is a flowchart illustrating an example of a standard shape registration processing procedure of the information processing device 101.

FIG. 13 is a flowchart illustrating an example of a standard shape registration processing procedure of the information processing device 101. In the flowchart of FIG. 13, first, the information processing device 101 determines whether designation of a target shape has been received (step S1301). The target shape designated here is 3D shape data designated for classifying the 3D shape data registered in the 3D shape DB 220, and is designated from, for example, the 3D shape DB 220.

Here, the information processing device 101 waits for reception of the designation of the target shape (step S1301: No). Then, when having received the designation of the target shape (step S1301: Yes), the information processing device 101 executes the unit shape creation processing for the target shape (step S1302).

Note that since a specific processing procedure of the unit shape creation processing for the target shape is similar to the processing procedure illustrated in FIG. 12, illustration and description are omitted. In the case where the unit 3D shape data of the target shape has already been created, the information processing device 101 may skip step S1302.

Next, the information processing device 101 executes shape classification processing for classifying a plurality of 3D shape data on the basis of the created unit 3D shape data (step S1303). The specific processing procedure of the shape classification processing will be described below with reference to FIG. 14.

Next, the information processing device 101 executes relational expression construction processing for constructing the dimensional relational expression between different sites of the 3D shape data in the classified group (step S1304). The specific processing procedure of the relational expression construction processing will be described below with reference to FIG. 15.

Then, the information processing device 101 uses the unit 3D shape data of each 3D shape data in the group as the standard shape data, and registers the standard shape data, the constructed relational expression, and the similar shape list in the standard shape DB 230 in association with one another (step S1305), respectively and terminates the series of processing according to the present flowchart.

As a result, the parametric model (relational expression) of the 3D shape classified by the standard shape data can be made into a DB along with the standard shape data (unit 3D shape data).

Next, the specific processing procedure of the shape classification processing in step S1303 illustrated in FIG. 13 will be described with reference to FIG. 14. Here, the unit 3D shape data of the target shape created in step S1302 illustrated in FIG. 13 is referred to as "unit target shape".

Figure 14:
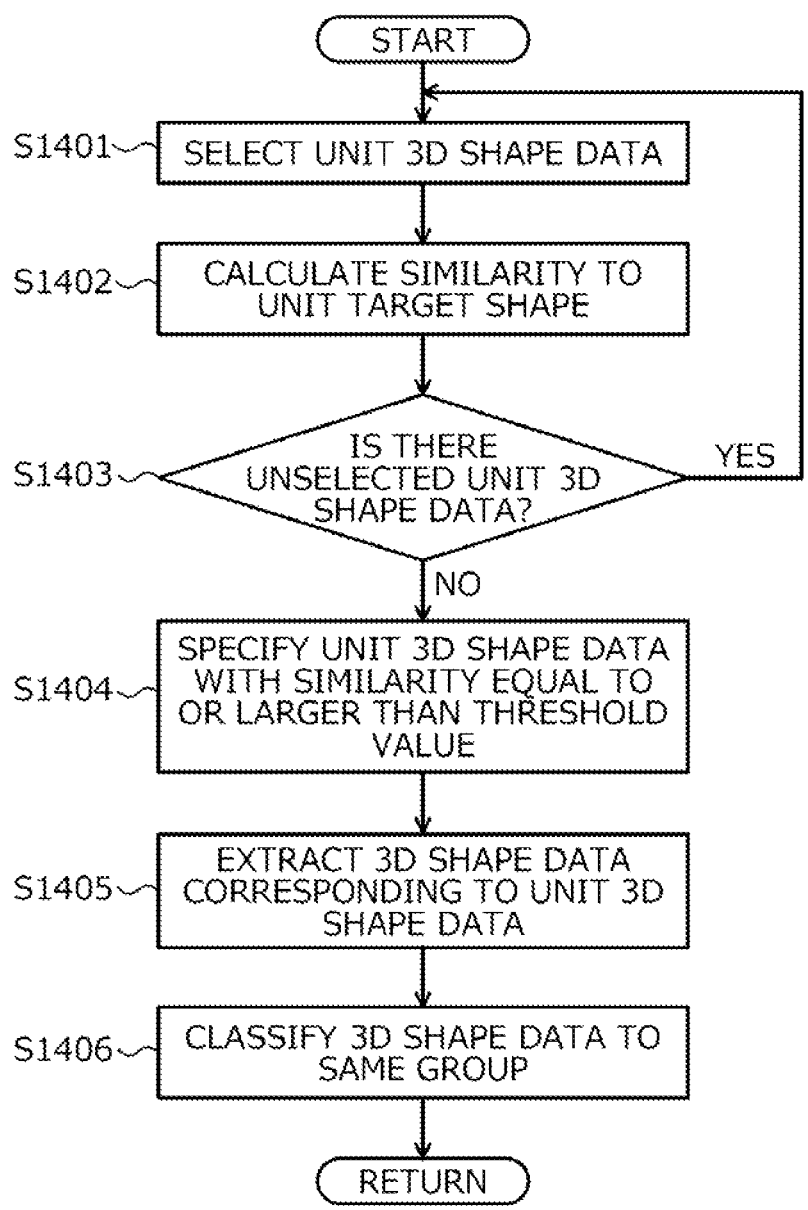
FIG. 14 is a flowchart illustrating an example of a specific processing procedure of shape classification processing.

FIG. 14 is a flowchart illustrating an example of a specific processing procedure of shape classification processing. In the flowchart of FIG. 14, first, the information processing device 101 selects unselected unit 3D shape data that has not been selected from the unit 3D shape data of each 3D shape data in the 3D shape DB 220 (step S1401).

Then, the information processing device 101 calculates the similarity between the selected unit 3D shape data and the created unit target shape (step S1402). Next, the information processing device 101 determines whether there is unselected unit 3D shape data that has not been selected among the unit 3D shape data of each 3D shape data in the 3D shape DB 220 (step S1403).

Here, in the case where there is unselected unit 3D shape data (step S1403: Yes), the information processing device 101 returns to step S1401. On the other hand, in the case where there is no unselected unit 3D shape data (step S1403: No), the unit 3D shape data with the calculated similarity equal to or larger than the threshold value is specified (step S1404).

Next, the information processing device 101 extracts the 3D shape data corresponding to the specified unit 3D shape data from the 3D shape DB 220 (step S1405). Then, the information processing device 101 classifies the extracted 3D shape data into the same group (step S1406) and returns to the step in which the shape classification processing is called.

As a result, 3D shape data having similar unit 3D shape data to the target 3D shape data can be classified into the same group.

Next, the specific processing procedure of the relational expression construction processing in step S1304 illustrated in FIG. 13 will be described with reference to FIG. 15.

Figure 15:
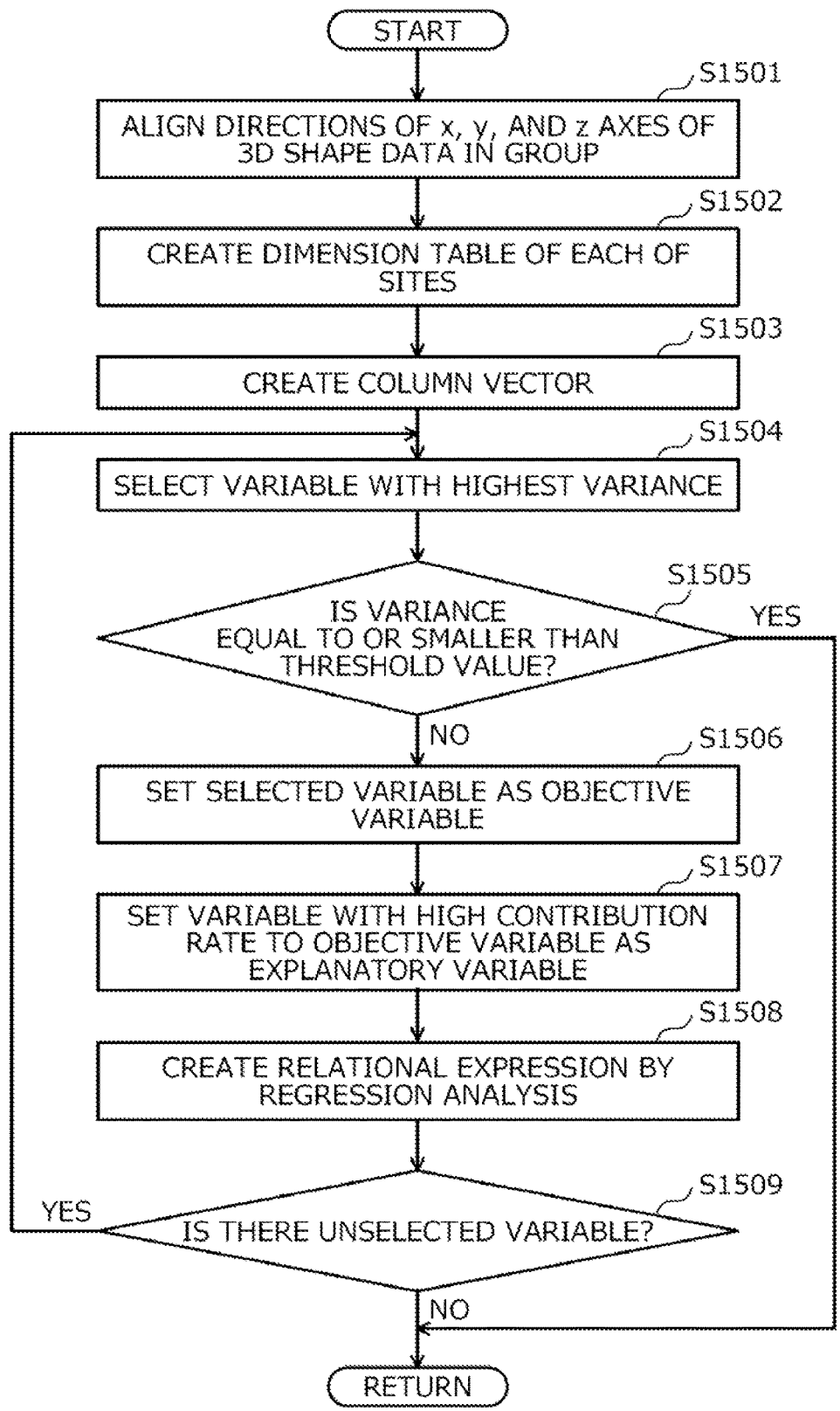
FIG. 15 is a flowchart illustrating an example of a specific processing procedure of relational expression construction processing.

FIG. 15 is a flowchart illustrating an example of the specific processing procedure of the relational expression construction processing. In the flowchart of FIG. 15, first, the information processing device 101 aligns the x-axis, y-axis, and z-axis directions of the classified 3D shape data in the group in step S1303 (step S1501).

Next, the information processing device 101 creates the dimension table of each site of the 3D shape data in the group (step S1502). Then, the information processing device 101 creates the column vector having the dimension in each 3D shape data as the element for each site by reference to the created dimension table of each site (step S1503).

Next, the information processing device 101 selects a variable having the highest variance using the created column vector of each site as variables (step S1504). Then, the information processing device 101 determines whether the variance of the selected variable is equal to or less than a predetermined threshold value (step S1505). The predetermined threshold value can be arbitrarily set.

Here, in the case where the variance is equal to or smaller than the predetermined threshold value (step S1505: Yes), the information processing device 101 returns to the step in which the relational expression construction processing is called.

On the other hand, in the case where the variance is larger than the predetermined threshold value (step S1505: No), the information processing device 101 sets the selected variable as the objective variable (step S1506). Next, the information processing device 101 sets a variable having a high contribution rate to the objective variable as the explanatory variable by the stepwise method (step S1507).

Then, the information processing device 101 creates the dimensional relational expression between different sites of the 3D shape data by the regression analysis based on the created column vector (step S1508). Next, the information processing device 101 determines whether there is an unselected variable that has not been selected (step S1509).

Here, in a case where there is an unselected variable (step S1509: Yes), the information processing device 101 returns to step S1503. On the other hand, in the case where there is no unselected variable (step S1509: No), the information processing device 101 returns to the step in which the relational expression construction processing is called.

Thereby, the relational expression indicating the dimensional relationship between different sites of the 3D shape data classified into the same group can be constructed.

Next, a first design processing procedure of the information processing device 101 will be described with reference to FIG. 16. The first design processing is processing of designating the target 3D shape data having a similar shape to the object and generating the design data for the object.

Figure 16:
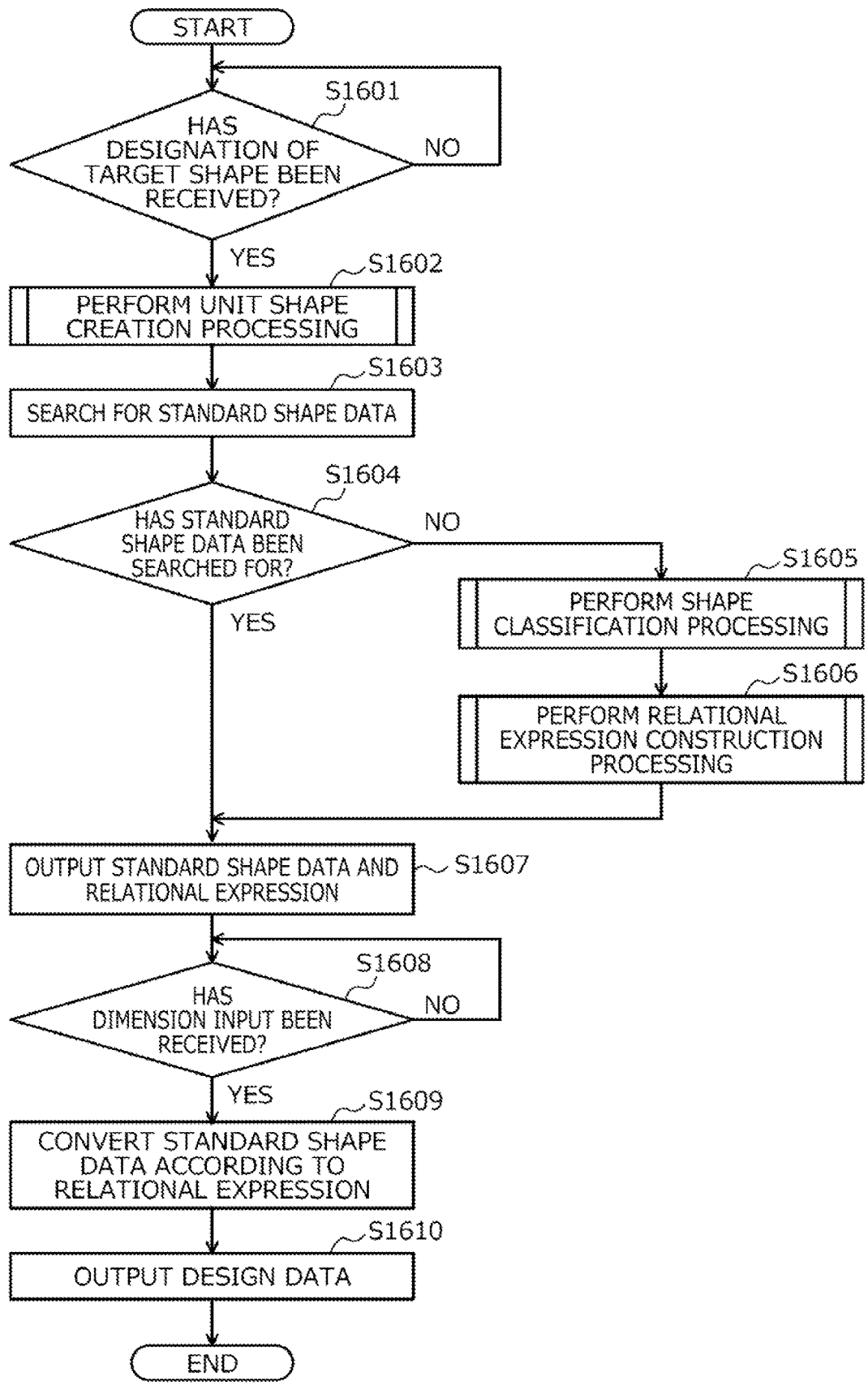
FIG. 16 is a flowchart illustrating an example of a first design processing procedure of the information processing device 101.

FIG. 16 is a flowchart illustrating an example of a first design processing procedure of the information processing device 101. In the flowchart of FIG. 16, first, the information processing device 101 determines whether designation of the target shape has been received (step S1601). The target shape designated here is 3D shape data having a similar shape to the object, and is designated from, for example, the 3D shape DB 220.

Here, the information processing device 101 waits for reception of the designation of the target shape (step S1601: No). Then, when having received the designation of the target shape (step S1601: Yes), the information processing device 101 executes the unit shape creation processing for the target shape (step S1602).

Note that since a specific processing procedure of the unit shape creation processing for the target shape is similar to the processing procedure illustrated in FIG. 12, illustration and description are omitted. In the case where the unit 3D shape data of the target shape has already been created, the information processing device 101 may skip step S1602.

Next, the information processing device 101 searches the standard shape DB 230 for the standard shape data similar to the unit 3D shape data of the target shape (step S1603). Then, the information processing device 101 determines whether the similar standard shape data has been searched (step S1604).

Here, in the case where the standard shape data is not searched (step S1604: No), the information processing device 101 executes shape classification processing for classifying a plurality of 3D shape data (step S1605). Next, the information processing device 101 executes the relational expression construction processing for constructing the dimensional relational expression between different sites of the 3D shape data in the classified group (step S1606) and proceeds to step S1607.

Note that since a specific processing procedure of shape classification processing in step S1605 is similar to the processing procedure illustrated in FIG. 14, illustration and description are omitted. Furthermore, since a specific processing procedure of relational expression construction processing in step S1606 is similar to the processing procedure illustrated in FIG. 15, illustration and description are omitted.

Furthermore, in the case where the standard shape data is searched in step S1604 (step S1604: Yes), the information processing device 101 outputs the searched standard shape data and the relational expression corresponding to the standard shape data (step S1607). Note that, in the case where the relational expression is constructed in step S1606, the information processing device 101 outputs the unit 3D shape data of any of the 3D shape data in the group as the standard shape data.

Next, the information processing device 101 determines whether input of the dimension of a specific site in the output standard shape data has been received (step S1608). The specific site in the standard shape data corresponds to the specific site of the 3D shape data that is the source of creating the standard shape data. The dimension of the specific site corresponds to the design requirements for the object.

Here, the information processing device 101 waits for reception of the input of the dimension of the specific site (step S1608: No). In the case of having received the input of the dimension of the specific site (step S1608: Yes), the information processing device 101 converts the standard shape data according to the relational expression on the basis of the input dimension of the specific site to generate the design data for the object (step S1609).

Then, the information processing device 101 outputs the generated design data (step S1610) and terminates the series of processing according to the present flowchart. Note that, in step S1607, the information processing device 101 may the output 3D shape data classified by the standard shape data.

Thereby, the designer can have the design data regarding the object automatically generated according to the relational expression (parametric relationship) on the basis of the standard shape data by designating the target shape and the dimension of the specific site when newly designing the object.

Next, a second design processing procedure of the information processing device 101 will be described with reference to FIG. 17. The second design processing is processing of generating the design data for the object by using an assembly composed of standard parts (standard shape data).

Figure 17:
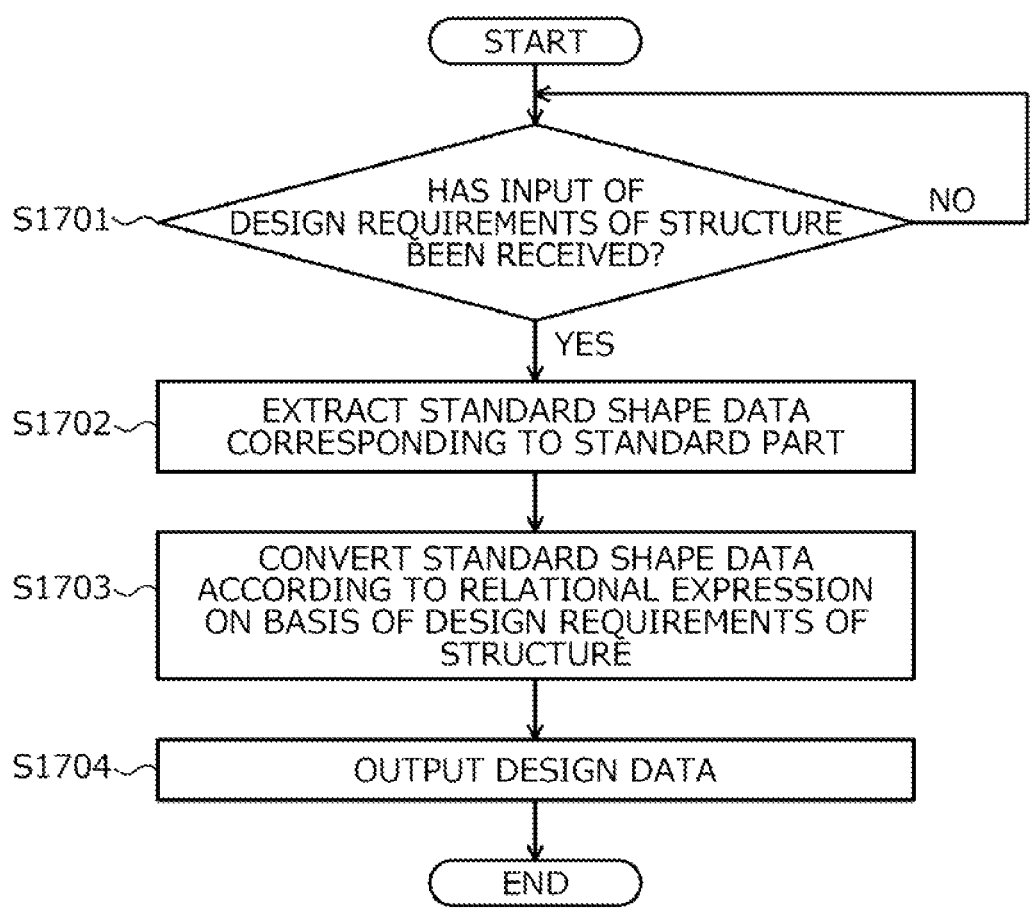
FIG. 17 is a flowchart illustrating an example of a second design processing procedure of the information processing device 101.

FIG. 17 is a flowchart illustrating an example of the second design processing procedure of the information processing device 101. In the flowchart of FIG. 17, first, the information processing device 101 determines whether input of design requirements of a structure has been received (step S1701). The design requirements of a structure include, for example, the dimensions of the structure to be designed (for example, the dimensions of a specific site of a standard part constituting the structure) and information for specifying constraint conditions between parts. The constraint conditions between parts indicate, for example, a site where the dimensions change between the parts in conjunction with each other, or the like.

Here, the information processing device 101 waits for reception of the input of the design requirements of the structure (step S1701: No). In the case of having received the input of the design requirements of the structure (step S1701: Yes), the information processing device 101 extracts the standard shape data corresponding to the standard parts constituting the structure from the standard shape DB 230 (step S1702).

Next, the information processing device 101 converts each standard shape data according to the relational expression corresponding to each extracted standard shape data on the basis of the design requirements of the structure to generate the design data regarding the structure (step S1703). Then, the information processing device 101 outputs the generated design data (step S1704) and terminates the series of processing according to the present flowchart.

As a result, the design data for the object can be automatically generated using the assembly composed of the standard parts (standard shape data).

Here, an example of generating the design data for the object using the assembly composed of standard parts will be described with reference to FIG. 18.

FIG. 18 is an explanatory diagram illustrating a generation example of the design data. In FIG. 18, a structure A is an assembly composed of a standard part a-std, a standard part b-std, a standard part c-std, and a standard part d-std. In this case, when the design requirements of the structure A are input, the information processing device 101 extracts the standard shape data corresponding to the standard parts a-std, b-std, c-std, and d-std constituting the structure A from the standard shape DB 230.

Next, the information processing device 101 converts each standard shape data according to the relational expression (parametric model) corresponding to each extracted standard shape data on the basis of the design requirements of the structure A to generate the 3D shape data of the parts a, b, c, and d. Then, the information processing device 101 generates the design data regarding the structure A on the basis of the generated 3D shape data of the parts a, b, c, and d.

As described above, according to the information processing device 101 of the embodiment, each 3D shape data of the plurality of 3D shape data is normalized for each component in each coordinate axis direction to create the unit 3D shape data, and the plurality of 3D shape data can be classified on the basis of the created unit 3D shape data of each 3D shape data. Furthermore, according to the information processing device 101, the dimensional relationship between different sites of the 3D shape data in the group is specified on the basis of the dimensions of the sites of the 3D shape data in the classified group, and the information indicating the specified dimensional relationship between sites can be output in association with the unit shape data of the shape data in the group.

Thereby, the parametric model (the dimensional relationship between sites) of the 3D shapes classified by the unit 3D shape data can be construct. Therefore, for example, the design data according to the design intent can be easily generated according to the parametric model on the basis of the unit 3D shape data.

Furthermore, according to the information processing device 101, the minimum value in each coordinate axis direction is extracted from the coordinates of each characteristic point of each 3D shape data, and the minimum value in each coordinate axis direction can be subtracted from each value of the coordinates of each characteristic point. Then, according to the information processing device 101, the maximum value in each coordinate axis direction is extracted from the coordinates of each characteristic point after subtraction, and each value of the coordinates of each characteristic point after subtraction is divided by the extracted maximum value in each coordinate axis direction, whereby the unit 3D shape data of each 3D shape data can be created.

As a result, the 3D shape data can be translated and normalized while maintaining the dimensional relationship between sites in each coordinate axis direction. Therefore, the parametric model can be constructed by classifying the 3D shape data with the same ratio in each coordinate axis direction. For example, not only the same shapes or similar shapes but also the shapes having partially different dimensions can be classified into the same group, and the versatility at the time of newly designing the object can be improved by performing grouping close to human sensibility.

Furthermore, according to the information processing device 101, the similarity between the pieces of unit 3D shape data of the respective pieces of 3D shape data is calculated, and the plurality of pieces of 3D shape data can be classified such that pieces of the 3D shape data corresponding to the combination of the pieces of unit 3D shape data in which the calculated similarity is equal to or larger than the threshold value belong to the same group.

Thereby, among the 3D shape data designed in the past, those having similar normalized unit shape data can be classified into the same group.

Furthermore, according to the information processing device 101, the vector having the dimension in each 3D shape data of the site as the element is created for each site in each 3D shape data, and the relational expression indicating the dimensional relationship between sites can be created on the basis of the created vector for each site, using a site of the plurality of sites in each 3D shape data as the objective variable and another site as the explanatory variable.

Thereby, the relational expression expressing the dimension of a certain site of the 3D shape data, using the parameter representing the dimension of another site can be derived by a statistical method such as the regression analysis.

Furthermore, according to the information processing device 101, a site having a relatively high variance of the elements of the created vector can be used as the objective variable among the plurality of sites in each 3D shape data.

Thereby, the relational expression can be constructed excluding a site with an unchanged dimension among the pieces of 3D shape data in the group from the objective variable.

Furthermore, according to the information processing device 101, the information indicating the specified dimensional relationship between sites can be stored in the storage unit 610 (for example, the standard shape DB 230) in association with the unit 3D shape data of the 3D shape data in the group.

As a result, the parametric model (relational expression) of the 3D shape classified by the unit 3D shape data can be made into a DB along with the unit 3D shape data.

Furthermore, according to the information processing device 101, designation of the target 3D shape data is received, the designated target 3D shape data is normalized for each component in each coordinate axis direction to create the target unit 3D shape data, the first unit 3D shape data similar to the created target unit 3D shape data is searched by reference to the storage unit 610, and the searched first unit 3D shape data and the information indicating the dimensional relationship between sites stored in the storage unit 610 in association with the first unit 3D shape data can be output.

As a result, the unit shape data to which the parametric model is given, the parametric model being constructed on the basis of the dimensions of the sites of the 3D shape data having the unit 3D shape data similar to the target 3D shape data can be provided as the standard shape data. For example, the designer can have the design data regarding the object automatically generated (parametric design) according to the parametric model on the basis of the standard shape data by designating the design requirements (for example, the dimension of the specific site) when newly designing the object.

Furthermore, according to the information processing device 101, the 3D shape data is further stored in the storage unit 610 in association with the unit 3D shape data of the 3D shape data in the group, and the shape data stored in the storage unit 610 in association with the searched first unit 3D shape data can be output.

As a result, the past 3D shape data having similar unit 3D shape data to the target 3D shape data can be provided. For example, the designer can design the object using the past 3D shape data having the unit 3D shape data similar to the target 3D shape data when newly designing the object.

Furthermore, according to the information processing device 101, the shape data stored in the storage unit 610 (3D shape DB 220 or standard shape DB 230) in association with the searched first unit 3D shape data, and the information indicating the dimensional relationship between sites can be output.

As a result, the past 3D shape data having similar unit 3D shape data to the target 3D shape data can be provided together with the parametric model. For example, the designer can have the design data regarding the object automatically generated according to the parametric model on the basis of the past 3D shape data by designating the design requirements (for example, the dimension of the specific site) when newly designing the object.

From these facts, according to the information processing device 101, the object can be newly designed using the standard shape data to which the parametric model (the dimensional relational expression between sites) is given. As a result, the man-hours needed for designing the 3D shape can be reduced. Furthermore, design mistakes can be reduced by changing the dimensions of the sites according to the parametric model at the time of newly designing the object. Furthermore, the standard shape data according to the design intent can be easily searched by searching for the standard shape data used at the time of newly designing the object on the basis of the unit 3D shape data.

Note that the shape data output method described in the present embodiment may be implemented by executing a program prepared in advance on a computer such as a personal computer or a workstation. The present shape data output program is recorded on a computer-readable recording medium such as a hard disk, a flexible disk, a compact disk read only memory (CD-ROM), a digital versatile disc (DVD), or a USB memory, and is read from the recording medium and executed by the computer. Furthermore, the present shape data output program may be distributed via a network such as the Internet.

Furthermore, the information processing device 101 described in the present embodiment can also be implemented by a special-purpose integrated circuit (IC) such as a standard cell or a structured application specific integrated circuit (ASIC) or a programmable logic device (PLD) such as a field-programmable gate array (FPGA).

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a shape data output program that causes at least one computer to execute process, the process comprising:
    creating unit shape data by normalizing each shape data of a plurality of pieces of shape data for each component in each coordinate axis direction;
    classifying the plurality of pieces of shape data based on the created unit shape data of each of the pieces of shape data;
    specifying, based on dimensions of sites of each shape data in classified group, a dimensional relationship between different sites of the shape data in the group; and
    outputting information indicating the specified dimensional relationship in association with the unit shape data of the shape data in the group,
    wherein the creating includes:
    extracting a minimum value in each coordinate axis direction from coordinates of each characteristic point of each of the pieces of shape data,
    subtracting the extracted minimum value in each coordinate axis direction from each value of the coordinates of each characteristic point,
    extracting a maximum value in each coordinate axis direction from the coordinates of each characteristic point after subtraction, and
    dividing each value of the coordinates of each characteristic point after subtraction by the extracted maximum value in each coordinate axis direction to create the unit shape data of each of the pieces of shape data.

2. The non-transitory computer-readable storage medium according to claim 1, wherein
    the classifying includes
    calculating a similarity between the pieces of unit shape data of the respective pieces of shape data, and
    classifying the plurality of pieces of shape data such that pieces of the shape data corresponding to a combination of the pieces of unit shape data in which the calculated similarity is equal to or larger than a threshold value belong to a same group.

3. The non-transitory computer-readable storage medium according to claim 1, wherein
    the specifying includes
    creating, for each site in each of the pieces of shape data, a vector including a dimension in each of the pieces of shape data of the site as an element, and
    creating a relational expression indicating the dimensional relationship based on the created vector for each site, using a site of a plurality of sites in each of the pieces of shape data as an objective variable and another site as an explanatory variable.

4. The non-transitory computer-readable storage medium according to claim 3, wherein
    a site including a relatively high variance of the created vector is set as the objective variable among the plurality of sites in each of the pieces of shape data.

5. The non-transitory computer-readable storage medium according to claim 4, wherein
    a site including a relatively high contribution rate to the objective variable is set as the explanatory variable among the plurality of sites in each of the pieces of shape data.

6. The non-transitory computer-readable storage medium according to claim 1, wherein
    the outputting includes storing information indicating the specified dimensional relationship in a storage unit in association with the unit shape data of the shape data in the group.

7. The non-transitory computer-readable storage medium according to claim 6, wherein the process further comprising:
    receiving designation of target shape data,
    normalizing the designated target shape data for each component in each coordinate axis direction to create the target unit shape data,
    searching for a first unit shape data similar to the created target unit shape data by reference to the storage unit, and
    outputting the searched first unit shape data and information indicating a dimensional relationship stored in the storage unit in association with the first unit shape data.

8. The non-transitory computer-readable storage medium according to claim 7, wherein
    the storage unit further stores the shape data in association with the unit shape data of the shape data in the group, and
    the outputting includes outputting shape data stored in the storage unit in association with the searched first unit shape data.

9. The non-transitory computer-readable storage medium according to claim 8, wherein
    the outputting includes outputting the shape data stored in the storage unit in association with the searched first unit shape data, and the information indicating a dimensional relationship.

10. A shape data output method for a computer to execute process, the process comprising:
    creating unit shape data by normalizing each shape data of a plurality of pieces of shape data for each component in each coordinate axis direction;
    classifying the plurality of pieces of shape data based on the created unit shape data of each of the pieces of shape data;
    specifying, based on dimensions of sites of each shape data in classified group, a dimensional relationship between different sites of the shape data in the group; and
    outputting information indicating the specified dimensional relationship in association with the unit shape data of the shape data in the group,
    wherein the creating includes:
    extracting a minimum value in each coordinate axis direction from coordinates of each characteristic point of each of the pieces of shape data,
    subtracting the extracted minimum value in each coordinate axis direction from each value of the coordinates of each characteristic point, extracting a maximum value in each coordinate axis direction from the coordinates of each characteristic point after subtraction, and dividing each value of the coordinates of each characteristic point after subtraction by the extracted maximum value in each coordinate axis direction to create the unit shape data of each of the pieces of shape data.

11. The shape data output method according to claim 10, wherein
the classifying includes
calculating a similarity between the pieces of unit shape data of the respective pieces of shape data, and
classifying the plurality of pieces of shape data such that pieces of the shape data corresponding to a combination of the pieces of unit shape data in which the calculated similarity is equal to or larger than a threshold value belong to a same group.

12. The shape data output method according to claim 10, wherein
the specifying includes
creating, for each site in each of the pieces of shape data, a vector including a dimension in each of the pieces of shape data of the site as an element, and
creating a relational expression indicating the dimensional relationship based on the created vector for each site, using a site of a plurality of sites in each of the pieces of shape data as an objective variable and another site as an explanatory variable.

13. The shape data output method according to claim 12, wherein
a site including a relatively high variance of the created vector is set as the objective variable among the plurality of sites in each of the pieces of shape data.

14. The shape data output method according to claim 10, wherein
the outputting includes storing information indicating the specified dimensional relationship in a storage unit in association with the unit shape data of the shape data in the group.

15. An information processing device comprising:
one or more memories; and
one or more processors coupled to the one or more memories and the one or more processors configured to
create unit shape data by normalizing each shape data of a plurality of pieces of shape data for each component in each coordinate axis direction, classify the plurality of pieces of shape data based on the created unit shape data of each of the pieces of shape data, specify, based on dimensions of sites of each shape data in classified group, a dimensional relationship between different sites of the shape data in the group, and output information indicating the specified dimensional relationship in association with the unit shape data of the shape data in the group, wherein the creating includes:
extracting a minimum value in each coordinate axis direction from coordinates of each characteristic point of each of the pieces of shape data,
subtracting the extracted minimum value in each coordinate axis direction from each value of the coordinates of each characteristic point,
extracting a maximum value in each coordinate axis direction from the coordinates of each characteristic point after subtraction, and
dividing each value of the coordinates of each characteristic point after subtraction by the extracted maximum value in each coordinate axis direction to create the unit shape data of each of the pieces of shape data.

16. The information processing device according to claim 15, wherein the one or more processors further configured to:
calculate a similarity between the pieces of unit shape data of the respective pieces of shape data, and
classify the plurality of pieces of shape data such that pieces of the shape data corresponding to a combination of the pieces of unit shape data in which the calculated similarity is equal to or larger than a threshold value belong to a same group.

17. The information processing device according to claim 15, wherein the one or more processors further configured to:
create, for each site in each of the pieces of shape data, a vector including a dimension in each of the pieces of shape data of the site as an element, and
create a relational expression indicating the dimensional relationship based on the created vector for each site, using a site of a plurality of sites in each of the pieces of shape data as an objective variable and another site as an explanatory variable.

* * * * *

UNITED STATES PATENT AND TRADEMARK OFFICE
CERTIFICATE OF CORRECTION

PATENT NO. : 11,710,295 B2
APPLICATION NO. : 17/405137
DATED : July 25, 2023
INVENTOR(S) : Aso et al.

It is certified that error appears in the above-identified patent and that said Letters Patent is hereby corrected as shown below:

On the Title Page

Item [73], delete "FUJITSU LIMITED, Kawaski (JP)" insert --FUJITSU LIMITED, Kawasaki (JP)--

Signed and Sealed this
Twenty-ninth Day of August, 2023

Katherine Kelly Vidal
*Director of the United States Patent and Trademark Office*